US012700144B2

(12) United States Patent
Pereira et al.

(10) Patent No.: US 12,700,144 B2
(45) Date of Patent: Aug. 4, 2026

(54) METHOD AND SYSTEM FOR FACILITATING AUGMENTED REALITY ENVIRONMENTS THROUGH FACIAL RECOGNITION

(71) Applicant: Blackbaud, Inc., Charleston, SC (US)

(72) Inventors: Luis Roberto Teixeira Pereira, Valencia (ES); Jainudeen Azlan Cuttilan, Surrey (GB); Peter K. Lukich, Hanahan, SC (US); Heather Holland Templeton, Charleston, SC (US)

(73) Assignee: Blackbaud, Inc., Charleston, SC (US)

( * ) Notice: Subject to any disclaimer, the term of this patent is extended or adjusted under 35 U.S.C. 154(b) by 462 days.

(21) Appl. No.: 18/084,487

(22) Filed: Dec. 19, 2022

(65) Prior Publication Data

US 2024/0202985 A1     Jun. 20, 2024

(51) Int. Cl.
*G06T 11/00* (2026.01)
*G06Q 30/0279* (2023.01)
*G06V 20/20* (2022.01)
*G06V 40/16* (2022.01)

(52) U.S. Cl.
CPC .......... *G06T 11/00* (2013.01); *G06Q 30/0279* (2013.01); *G06V 20/20* (2022.01); *G06V 40/168* (2022.01); *G06V 40/172* (2022.01); *G06T 2200/24* (2013.01)

(58) Field of Classification Search
CPC .... G06V 40/168; G06V 40/172; G06V 20/20; G06T 11/00; G06T 2200/24; G06Q 30/0279
See application file for complete search history.

(56) References Cited

U.S. PATENT DOCUMENTS

| | | | |
|---|---|---|---|
| 8,429,024 B1 * | 4/2013 | Hermreck ............... | G06Q 40/02 705/30 |
| 9,881,295 B1 * | 1/2018 | Buddhavarapu ..... | G06Q 20/322 |
| 11,601,618 B1 * | 3/2023 | Slotznick ............... | H04N 7/147 |
| 2015/0301787 A1 * | 10/2015 | Greco ..................... | G06F 3/012 345/633 |
| 2015/0379591 A1 * | 12/2015 | Massarik ............... | G06Q 40/10 705/7.39 |
| 2016/0350817 A1 * | 12/2016 | Garbarino .......... | G06Q 30/0279 |
| 2021/0406668 A1 * | 12/2021 | Hack ..................... | G06N 3/0675 |
| 2022/0066456 A1 * | 3/2022 | Ebrahimi Afrouzi ........................ G06F 3/04883 |

(Continued)

*Primary Examiner* — Phi Hoang
(74) *Attorney, Agent, or Firm* — Gregory Finch; Finch Paolino, LLC

(57) ABSTRACT

An augmented reality system and method for facilitating one or more transactions via facial recognition. In accordance with certain aspects of the present disclosure, an augmented reality system comprises an augmented reality display rendered at a graphical user interface of an end user device, such as a smartphone. The end user may scan a physical environment via a camera of the end user device. A real-time view of the physical environment may be rendered at the augmented reality display. The augmented reality system may be configured to recognize one or more human faces present in the augmented reality display and render one or more augmented reality elements within the augmented reality display in response to processing images of the one or more human faces according to a facial recognition processing model.

20 Claims, 18 Drawing Sheets

(56) References Cited

U.S. PATENT DOCUMENTS

| | | | |
|---|---|---|---|
| 2023/0046250 A1* | 2/2023 | Burch | G06V 40/172 |
| 2023/0073410 A1* | 3/2023 | Tussy | G06F 21/32 |
| 2023/0079929 A1* | 3/2023 | Bradski | G06V 20/20 |
| | | | 385/37 |
| 2024/0112189 A1* | 4/2024 | Ariav | G07F 17/0035 |

* cited by examiner

300

400

600

700

800

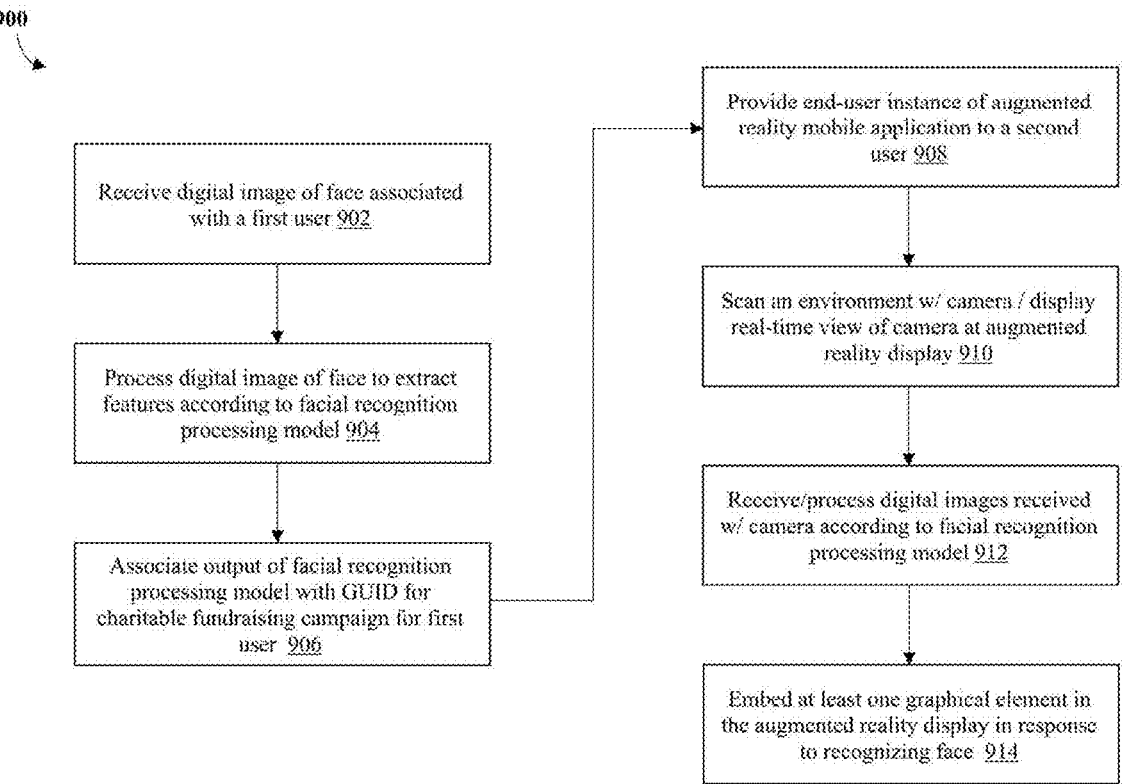

900

Receive digital image of face associated with a first user 902

Process digital image of face to extract features according to facial recognition processing model 904

Associate output of facial recognition processing model with GUID for charitable fundraising campaign for first user 906

Provide end-user instance of augmented reality mobile application to a second user 908

Scan an environment w/ camera / display real-time view of camera at augmented reality display 910

Receive/process digital images received w/ camera according to facial recognition processing model 912

Embed at least one graphical element in the augmented reality display in response to recognizing face 914

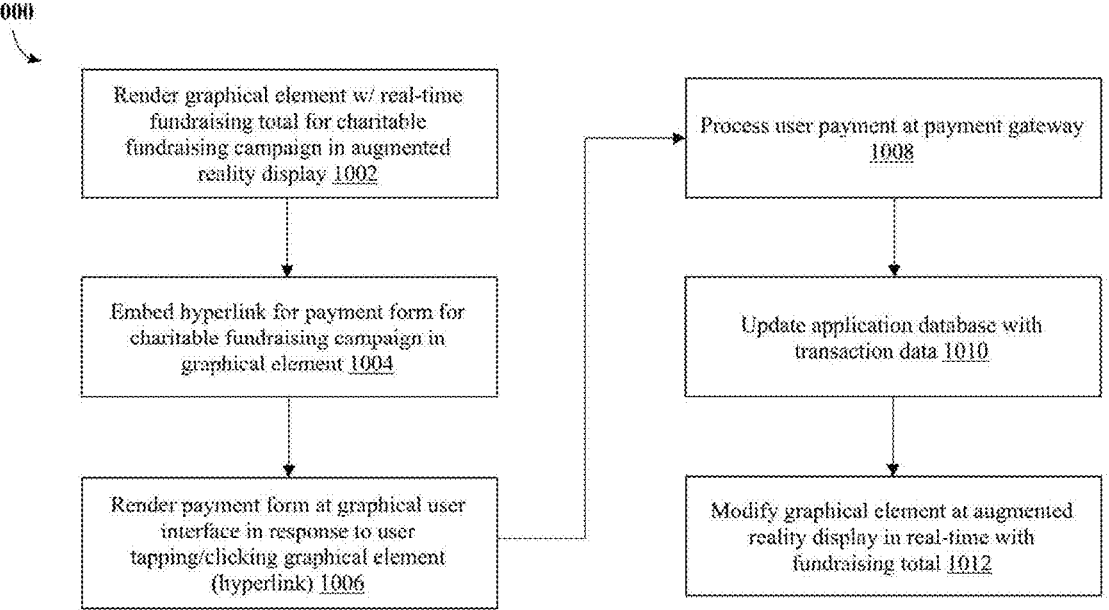

Render graphical element w/ real-time fundraising total for charitable fundraising campaign in augmented reality display 1002

Embed hyperlink for payment form for charitable fundraising campaign in graphical element 1004

Render payment form at graphical user interface in response to user tapping/clicking graphical element (hyperlink) 1006

Process user payment at payment gateway 1008

Update application database with transaction data 1010

Modify graphical element at augmented reality display in real-time with fundraising total 1012

Review photo:

Fundraising page GUID: XYZ-123-ABC-456-def

Captured photo:

1206

1102

1208

Link Face     Retake Photo

METHOD AND SYSTEM FOR FACILITATING AUGMENTED REALITY ENVIRONMENTS THROUGH FACIAL RECOGNITION

FIELD

The present disclosure relates to the field of augmented reality and image processing systems; in particular, a method and system for facilitating augmented reality environments through facial recognition to conduct transactions.

BACKGROUND

Augmented reality (AR) is an interactive experience of a real-world environment where the objects that reside in the real world are enhanced by computer-generated perceptual information, sometimes across multiple sensory modalities, including visual, auditory, haptic, somatosensory and olfactory. AR can be defined as a system that incorporates three basic features: a combination of real and virtual worlds, real-time interaction, and accurate 3D registration of virtual and real objects. The overlaid sensory information can be constructive (i.e., additive to the natural environment), or destructive (i.e., masking of the natural environment). This experience is seamlessly interwoven with the physical world such that it is perceived as an immersive aspect of the real environment. In this way, augmented reality alters one's ongoing perception of a real-world environment, whereas virtual reality completely replaces the user's real-world environment with a simulated one. Augmented reality is related to two largely synonymous terms: mixed reality and computer-mediated reality.

The primary value of augmented reality is the manner in which components of the digital world blend into a person's perception of the real world, not as a simple display of data, but through the integration of immersive sensations, which are perceived as natural parts of an environment. The earliest functional AR systems that provided immersive mixed reality experiences for users were invented in the early 1990's, starting with the Virtual Fixtures system developed at the U.S. Air Force's Armstrong Laboratory in 1992. Commercial augmented reality experiences were first introduced in entertainment and gaming businesses. Subsequently, augmented reality applications have spanned commercial industries such as education, communications, medicine, and entertainment. In education, content may be accessed by scanning or viewing an image with a mobile device or by using markerless AR techniques.

Augmented reality is used to enhance natural environments or situations and offer perceptually enriched experiences. With the help of advanced AR technologies (e.g., adding computer vision, incorporating AR cameras into smartphone applications and object recognition), the information about the surrounding real world of the user becomes interactive and digitally manipulated. Information about the environment and its objects is overlaid on the real world. This information can be virtual. Augmented Reality is any experience which is artificial, and which adds to the already existing reality (e.g., seeing other real sensed or measured information such as electromagnetic radio waves overlaid in exact alignment with where they actually are in space). Augmentation techniques are typically performed in real time and in semantic contexts with environmental elements. Immersive perceptual information is sometimes combined with supplemental information like scores over a live video feed of a sporting event. This combines the benefits of both augmented reality technology and heads up display technology (HUD).

Through applied effort, ingenuity, and innovation, Applicant has identified a number of deficiencies and problems associated with facilitating augmented reality environments through the use of facial recognition models. Applicant has developed a solution that is embodied by the present disclosure, which is described in detail below.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Certain aspects of the present disclosure provide for an augmented reality method for facilitating online transactions comprising receiving, with at least one processor, a digital image of a face, wherein the face is associated with a first user; processing, with the at least one processor, the digital image of the face of the first user to extract one or more features of the first user's face, wherein the one or more features are analyzed according to a facial recognition processing model; associating, with the at least one processor, an output of the facial recognition processing model with a globally unique identifier in an application database, wherein the globally unique identifier is associated with a charitable fundraising campaign, wherein the charitable fundraising campaign is associated with the first user in the application database; presenting, with a mobile electronic device comprising a camera, an instance of a mobile software application comprising a graphical user interface to a second user; displaying, with the mobile electronic device, a real-time view of the camera in a window of the graphical user interface to the second user, wherein the real-time view of the camera comprises an augmented reality display; processing, with the at least one processor, digital images received at the real-time view of the camera according to the facial recognition processing model, wherein the facial recognition processing model is configured to recognize at least one face from the digital images received at the real-time view of the camera and determine whether the at least one face comprises the first user's face; and embedding in real-time, with the at least one processor via the instance of the mobile software application, at least one graphical element in the augmented reality display in response to recognizing the at least one face, wherein upon determining the at least one face comprises the first user's face, the at least one graphical element is configured to comprise a hyperlink configured to access a transaction form associated with the charitable fundraising campaign.

In accordance with certain embodiments, the augmented reality method for facilitating online transactions may be configured wherein, upon determining the at least one face comprises the first user's face, the at least one graphical element is configured to comprise a graphical display of a fundraising total for the charitable fundraising campaign, wherein the fundraising total is stored in the application database. In accordance with certain embodiments, the method may further comprise updating the at least one graphical element in real-time to display a real-time fundraising total for the charitable fundraising campaign. In accordance with certain embodiments, the method may be configured wherein, upon determining the at least one face comprises the first user's face, the at least one graphical element is configured to comprise a graphical display of a word or image personalized for the first user. In accordance with certain aspects of the present disclosure, the method may further comprise updating, in real-time with the at least one processor via the instance of the mobile software application, the at least one graphical element in response to recognizing a second or subsequent face from the digital images received at the real-time view of the camera. In accordance with certain embodiments, the second or subsequent face may be different from the first user's face. In accordance with certain aspects of the present disclosure, the method may further comprise capturing, with the camera via the graphical user interface, a still digital image and processing the still image according to the facial recognition processing model to recognize the at least one face from the still digital image.

Further aspects of the present disclosure provide for a processor-implemented system comprising a mobile electronic device comprising a camera and a display; and at least one server communicably engaged with the mobile electronic device via a communications network, wherein the at least one server comprises at least one processor and a non-transitory computer readable storage medium having instructions stored thereon that, when executed by the at least one processor, cause the at least one processor to perform one or more operations, the one or more operations comprising processing one or more digital images of one or more faces according to a facial recognition processing model; associating at least one face in the one or more faces with a globally unique identifier in an application database, wherein the globally unique identifier is associated with a charitable fundraising campaign stored in the application database; providing a mobile software application to the mobile electronic device, wherein the mobile software application comprises a graphical user interface comprising a real-time viewer for the camera, wherein the graphical user interface is rendered at the display of the mobile electronic device; processing digital images received at the camera in real-time according to the facial recognition processing model, wherein the facial recognition processing model is configured to recognize the at least one face in the one or more faces; and rendering an augmented reality display at the graphical user interface in response to recognizing the at least one face from the digital images received at the camera in real-time, wherein the augmented reality display comprises embedding at least one graphical element in the real-time viewer for the camera, wherein the at least one graphical element comprises a hyperlink configured to access a transaction form associated with the charitable fundraising campaign.

In accordance with certain aspects of the present disclosure, the augmented reality method for facilitating online transactions may be configured wherein the at least one graphical element comprises a graphical display of a fundraising total for the charitable fundraising campaign, wherein the fundraising total is stored in the application database. In accordance with certain embodiments, the one or more operations may further comprise updating the at least one graphical element in real-time to display a real-time fundraising total for the charitable fundraising campaign in the augmented reality display. In accordance with certain embodiments, the one or more operations may further comprise rendering a payment form for the charitable fundraising campaign at the graphical user interface in response to a user tapping or clicking the hyperlink in the augmented reality display. In accordance with certain embodiments, the one or more operations may further comprise modifying the at least one graphical element in the augmented reality display in response to the facial recognition processing model recognizing a second or subsequent face from the digital images received at the camera in real-time. In accordance with certain embodiments, the one or more operations may further comprise determining whether the second or subsequent face is associated with a second or subsequent charitable fundraising campaign stored in the application database. In accordance with certain embodiments, the one or more operations may further comprise embedding a second or subsequent hyperlink in the modified at least one graphical element, wherein the second or subsequent hyperlink is configured to access a second or subsequent transaction form associated with the second or subsequent charitable fundraising campaign.

Still further aspects of the present disclosure provide for an augmented reality method for facilitating online transactions comprising providing, with at least one processor, an end user application comprising an augmented reality display to an end user computing device, wherein the augmented reality display comprises a real-time feed from at least one camera communicably engaged with the at least one processor; processing, with the at least one processor, images received at the real-time feed from the at least one camera according to a facial recognition processing model, wherein the facial recognition processing model is configured to recognize at least one face from the images received at the real-time feed from the at least one camera; and embedding in real-time, with the at least one processor via the end user application, at least one graphical element in the augmented reality display in response to recognizing the at least one face, wherein the at least one graphical element comprises a hyperlink configured to access a transaction form associated with a charitable fundraising campaign stored in an application database, wherein the charitable fundraising campaign is associated with an output of the facial recognition processing model.

In accordance with certain embodiments, the augmented reality method for facilitating online transactions may be configured wherein the at least one graphical element comprises a graphical display of a fundraising total for the charitable fundraising campaign. In accordance with certain embodiments, the augmented reality method may further comprise updating, with the at least one processor via the end user application, the at least one graphical element in real-time to display a real-time fundraising total for the charitable fundraising campaign in the augmented reality display. In accordance with certain embodiments, the augmented reality method may further comprise modifying in real-time, with the at least one processor via the end user application, the at least one graphical element in response to recognizing a second or subsequent face from the images received at the real-time feed from the at least one camera. In accordance with certain embodiments, the augmented reality method may further comprise determining, with the at least one processor, whether the second or subsequent face is associated with a second or subsequent charitable fundraising campaign stored in the application database. In accordance with certain embodiments, the augmented reality method may further comprise embedding a second or subsequent hyperlink in the modified at least one graphical element, wherein the second or subsequent hyperlink is configured to access a second or subsequent transaction form associated with the second or subsequent charitable fundraising campaign.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The above and other objects, features and advantages of the present disclosure will be more apparent from the following detailed description taken in conjunction with the accompanying drawings, in which:

FIG. 9 is a process flow diagram of a method for facilitating online transactions in an augmented reality interface, in accordance with certain aspects of the present disclosure;

FIG. 10 is a process flow diagram of a method for facilitating online transactions in an augmented reality interface, in accordance with certain aspects of the present disclosure;

DETAILED DESCRIPTION

Figure 1:
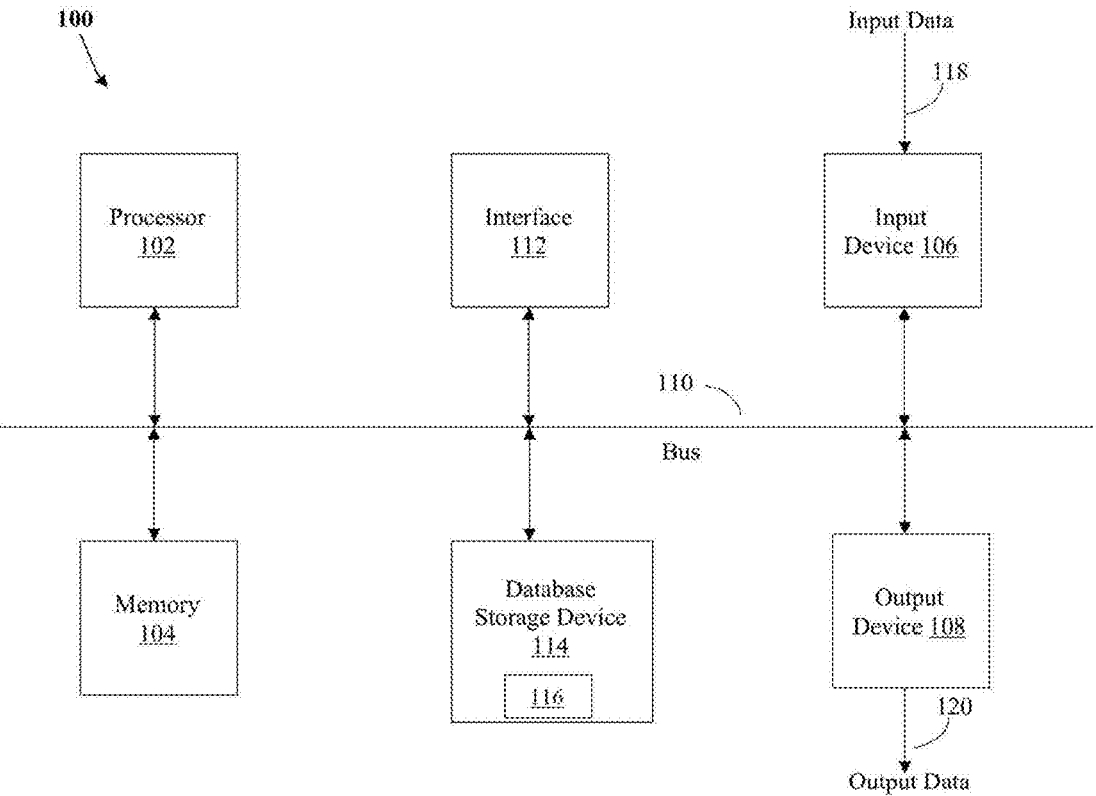
FIG. 1 is an illustrative embodiment of a computing device through which one or more aspects of the present disclosure may be implemented.

It should be appreciated that all combinations of the concepts discussed in greater detail below (provided such concepts are not mutually inconsistent) are contemplated as being part of the inventive subject matter disclosed herein. It also should be appreciated that terminology explicitly employed herein that also may appear in any disclosure incorporated by reference should be accorded a meaning most consistent with the particular concepts disclosed herein.

Following below are more detailed descriptions of various concepts related to, and embodiments of, inventive methods, apparatus and systems for rendering augmented reality interfaces using facial recognition processing for facilitating mobile or online transactions. In accordance with certain aspects of the present disclosure, an augmented reality method and system comprises training a facial recognition processing model (e.g., a convolutional recurrent neural network) to recognize one or more faces and associate each face in the one or more faces with one or more data tags for one or more online fundraising campaign (e.g., a globally unique identifier) and storing each face and tagged data in an application database. In accordance with certain embodiments, an instance of an end user application is provided to a mobile electronic device comprising at least one camera. In accordance with certain embodiments, an end user launches an instance of the end user application and scans an environment with the camera. A real time view of the camera is rendered at the augmented reality display. In accordance with certain embodiments, human faces that enter the field of view in the augmented reality display are analyzed according to the facial recognition processing model to identify one or more known faces stored in the application database. The data associated with the one or more known faces is utilized by the end user application to render one or more augmented reality elements in the augmented reality display. In accordance with certain aspects of the present disclosure, the one or more augmented reality elements may include a graphical display of a monetary total rendered at or near (e.g., above the head) the one or more known faces in the augmented reality display. In certain embodiments, the one or more augmented reality elements may include a graphical element (e.g., an image or a button) rendered at or near (e.g., above the head) the one or more known faces in the augmented reality display. In accordance with certain aspects of the present disclosure, the graphical element may include an embedded hyperlink for one or more webpages or application pages; for example, a payment form/page associated with the charitable fundraising campaign configured to receive payment data from the end user and process the payment data at a transaction gateway. In accordance with certain aspects of the present disclosure, the augmented reality display may be updated in real-time to reflect one or more user interactions; for example, in response to one or more users executing one or more transactions associated with the charitable fundraising campaign.

Before the present invention and specific exemplary embodiments of the invention are described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "interface" refers to any shared boundary across which two or more separate components of a computer system may exchange information. The exchange can be between software, computer hardware, peripheral devices, humans, and combinations thereof.

As used herein, "facial recognition" means any technology capable of matching a human face from a digital image or a video frame against a database of faces by pinpointing and measuring facial features from a given image according to one or more mathematical model.

As used herein, "model" or "mathematical model" or "facial recognition model" or "facial recognition processing model" means any mathematical framework by which a facial recognition analysis in accordance with certain aspects of the present disclosure may be executed; for example, machine learning frameworks and artificial intelligence frameworks. Examples of models frameworks by which a facial recognition analysis may be executed in accordance with certain aspects of the present disclosure include, but are not limited to, deep neural networks, convolutional neural networks, artificial neural networks, deep learning convolutional neural networks, shift invariant or space invariant artificial neural networks, and the like.

As used herein, the terms "campaign" or "fundraising campaign" or "charitable fundraising campaign" may be used interchangeably and may mean any effort by a charitable or non-profit organization or supporter thereof to raise either a fixed or unlimited amount of funds over a fixed or indefinite period of time. A "campaign" or "fundraising campaign" or "charitable fundraising campaign" may comprise one or more means for collecting funds through an online payment method, such as a credit card processing form available through one or more webpages.

As used herein, the term "augmented reality" means any interactive experience of a real-world environment where objects that reside in the real world are enhanced by computer-generated perceptual information, sometimes across multiple sensory modalities, including visual, auditory, haptic, somatosensory and olfactory.

As used herein, the term "hyperlink" or "link" may be used interchangeably and mean any data that a user can follow by clicking or tapping the hyperlink or link in a graphical user interface. In accordance with certain aspects of the present disclosure, a hyperlink or link may be embedded in another graphical element (e.g., image or illustration) rendered at a graphical user interface.

An exemplary system, method, and apparatus according to the principles herein may include a method and system for rendering an augmented reality display in a user interface based on the output of a facial recognition processing model. An output obtained from the facial recognition processing model may be utilized by exemplary embodiments of the present disclosure to retrieve data from an application database and embed said data into one or more graphical elements rendered at the augmented reality display. In accordance with certain embodiments, the augmented reality display comprises a real-time view of a camera from a mobile electronic device.

Certain benefits and advantages of the present disclosure include facilitating mobile/online transactions at live events via facial image recognition processing. Further benefits and advantages may include enabling a real-time display of data associated with a known individual based on an output of a facial recognition processing model within an augmented reality interface.

Turning now descriptively to the drawings, in which similar reference characters denote similar elements throughout the several views, FIG. 1 depicts an exemplary computing system in which certain illustrated embodiments of the present invention may be implemented.

Referring now to FIG. 1, a processor-implemented computing device in which one or more aspects of the present disclosure may be implemented is shown. According to an embodiment, a processing system 100 may generally comprise at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100. Input device 106 receives input data 118 and can comprise, for example, a keyboard, a pointer device such as a pen-like device or a mouse, audio receiving device for voice-controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, at least one database 116. The interface 112 may allow wired and/or wireless communication between the processing unit 102 and peripheral components that may serve a specialized purpose. In general, the processor 102 can receive instructions as input data 118 via input device 106 and can display processed results or other output to a user by utilizing output device 108. More than one input device 106 and/or output device 108 can be provided. It should be appreciated that the processing system 100 may be any form of terminal, server, specialized hardware, or the like.

It is to be appreciated that the processing system 100 may be a part of a networked communications system. Processing system 100 could connect to a network, for example the Internet or a WAN. Input data 118 and output data 120 could be communicated to other devices via the network. The transfer of information and/or data over the network can be achieved using wired communications means or wireless communications means. A server can facilitate the transfer of data between the network and one or more databases. A server and one or more databases provide an example of an information source.

Thus, the processing computing system environment 100 illustrated in FIG. 1 may operate in a networked environment using logical connections to one or more remote computers. The remote computer may be a personal computer, a server, a router, a network PC, a peer device, or other common network node, and typically includes many or all of the elements described above.

It is to be further appreciated that the logical connections depicted in FIG. 1 include a local area network (LAN) and a wide area network (WAN) but may also include other networks such as a personal area network (PAN). Such networking environments are commonplace in offices, enterprise-wide computer networks, intranets, and the Internet. For instance, when used in a LAN networking environment, the computing system environment 100 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 100, or portions thereof, may be stored in a remote memory storage device. It is to be appreciated that the illustrated network connections of FIG. 1 are exemplary and other means of establishing a communications link between multiple computers may be used.

FIG. 1 is intended to provide a brief, general description of an illustrative and/or suitable exemplary environment in which embodiments of the below described present invention may be implemented. FIG. 1 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing system environment 100 of FIG. 1. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

With the exemplary computing system environment 100 of FIG. 1 being generally shown and discussed above, description will now turn towards illustrated embodiments of the present invention which generally relates to systems and methods for rendering augmented reality interfaces using facial recognition processing for facilitating mobile or online transactions.

Figure 2:
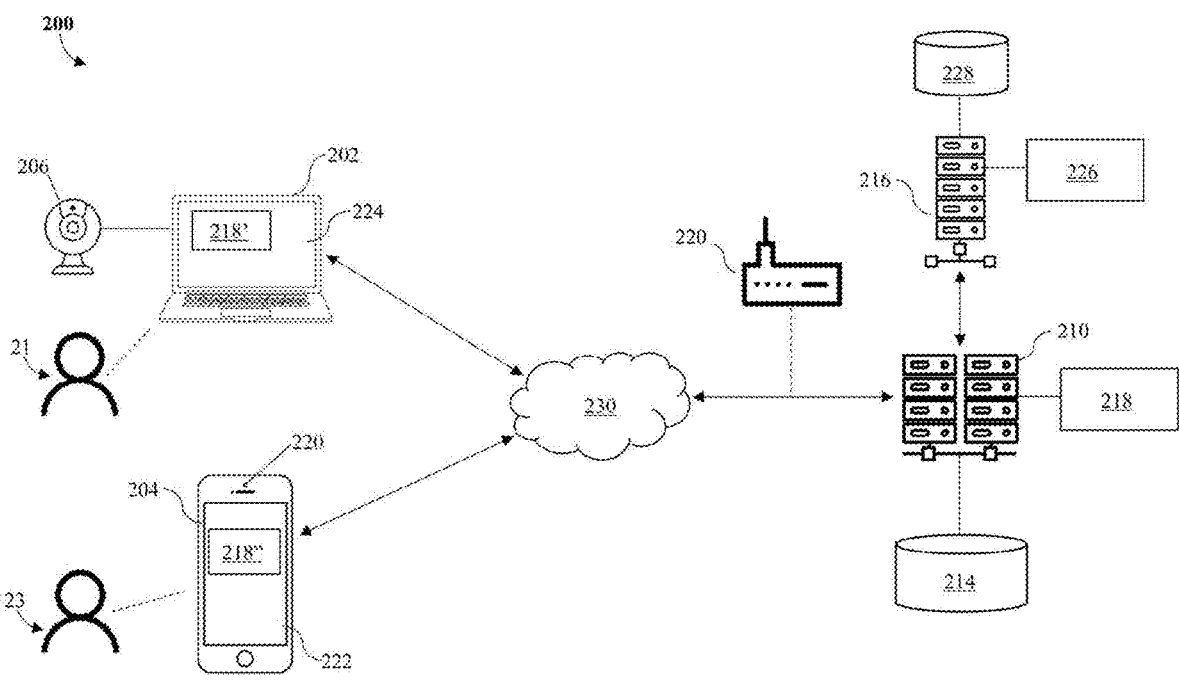
FIG. 2 is an architecture diagram of an augmented reality system for facilitating online transactions, in accordance with certain aspects of the present disclosure.

Referring now to FIG. 2, an architecture diagram of an augmented reality system 200 for facilitating online transactions is shown. In accordance with certain aspects of the present disclosure, system 200 may be configured to enable an augmented reality display at a user interface using facial recognition to facilitate one or more electronic transactions. In accordance with certain aspects of the present disclosure, system 200 may comprise an end user device 204 and at least one client device 202 communicably engaged with at least one remote application server 210 via a communications network (e.g., Internet). In accordance with certain embodiments, end user device 204 may comprise a smartphone or other mobile computing device. End user device 204 may comprise at least one camera 220 operably engaged with a display 222 to render a real-time view of images captured at camera 220. In accordance with certain embodiments, client device 202 may comprise a personal computing device such as a laptop computer. Client device 202 may be communicably engaged with at least one digital camera 206 configured to capture a photograph or a facial scan of a face of a client user 21. In accordance with certain aspects of the present disclosure, first user 21 may comprise a user associated with at least one charitable fundraising campaign; for example, a campaign supporter, administrator, charitable donor and the like.

In accordance with certain aspects of the present disclosure, system 200 may comprise an application database 214 communicably engaged with application server 210. In accordance with certain aspects of the present disclosure, application database 214 may be configured to store data associated with an augmented reality application 218, including, but not limited to user data, fundraising campaign data and transaction data. Application server 210 may comprise one or more processors communicably engaged with one or more non-transitory computer readable storage medium comprising instructions stored thereon that, when executed by the one or more processors, cause the one or more processors to execute operations of augmented reality application 218. System 200 may further comprise a facial recognition server 216 comprising a facial recognition processing engine 226 executing thereon. In accordance with certain aspects of the present disclosure, facial recognition processing engine 226 is configured to perform one or more operations of a facial recognition processing model. In accordance with certain aspects of the present disclosure, the facial recognition processing model may comprise one or more operations for analyzing one or more features of a human face from a digital image or a video frame to configure one or more identifying facial attributes for the human face and store the one or more identifying facial attributes in a facial recognition database 228. The facial recognition processing model may further comprise one or more operations for matching a human face from a digital image or a video frame to one or more stored attributes in facial recognition database 228 by pinpointing and measuring facial features from a given image according to the facial recognition processing model. In certain embodiments, application server 210 may be communicably engaged with facial recognition server 216 via one or more application programming interface (API) and/or software development kit (SDK). In accordance with certain aspects of the present disclosure, system 200 may further comprise a transaction gateway 230 being communicably engaged (e.g., as an intermediary) between end user device 204 and/or client device 202 and application server 210 to process payment data and execute a payment transaction with at least one banking institution.

In accordance with certain aspects of the present disclosure, system 200 may be operably configured to provide a client-side instance 218' of augmented reality application 218. In accordance with certain aspects of the present disclosure, client-side instance 218' of augmented reality application 218 may comprise a workflow configured to enable a client user 21 to capture a digital photograph or digital live scan of the client user's 21 face via digital camera 206. In certain embodiments, the digital photograph may be uploaded from a file rather than being captured in real-time by digital camera 206. In accordance with certain embodiments, client-side instance 218' of augmented reality application 218 may be configured to enable client user 21 to select a globally unique identifier, or other identification means, to link a charitable fundraising campaign from application database 214 to client user's 21 face. Client-side instance 218' of augmented reality application 218 may be configured to communicate the digital photograph or digital live scan of the client user's 21 face and the charitable fundraising campaign identification data to application database 210. Application database 210 may be configured to communicate the digital photograph or digital live scan of the client user's 21 face to facial recognition server 216. Facial recognition processing engine 226 may analyze the digital photograph or digital live scan of the client user's 21 face according to the facial recognition processing model to extract one or more identifying features of client user's 21 face and store the user identification data in facial recognition database 228 and/or communicate the user identification data to application server 210 to be stored in application database 214. Application server 210 may associate the user identification data with the charitable fundraising campaign identification data in application database 214.

In accordance with certain aspects of the present disclosure, system 200 may be configured to render an end user instance 218" of augmented reality application 218 at a display 222 of end user device 204. In accordance with certain aspects of the present disclosure, an end user 23 may launch end user instance 218" of augmented reality application 218 on end user device 204. Augmented reality application 218 may be configured to render an augmented reality interface comprising a real-time feed of digital images captured by camera 220. In accordance with certain aspects of the present disclosure, end user 23 may scan a physical environment with camera 220 and augmented reality application 218 may render a frame of the physical environment comprising a real-time feed of digital images from the physical environment captured by camera 220 at the augmented reality interface. In accordance with certain embodiments, augmented reality application 218 is configured to continuously perform facial recognition operations on the real-time feed of digital images from the physical environment captured by camera 220 to determine if any human face(s) are present in the view. If augmented reality application 218 determines a face is present in the augmented reality interface, application server 210 and/or facial recognition server 216 perform one or more operations to determine whether the human face(s) are associated with a known face in application database 214 and/or the facial recognition database 228. If so, application database 214 may query fundraising campaign data associated with the known face(s) (if any) and communicate the data to application server 210. Augmented reality application 218 may process the data to generate one or more augmented reality elements, such as graphical elements, image filters, text and the like, and render the one or more augmented reality elements over the real-time feed of digital images from the physical environment at the augmented reality interface. In certain embodiments, the one or more augmented reality elements may comprise a text display adjacent to (e.g., above or below) a real-time feed of the known face, wherein the text display comprises a fundraising total for the charitable fundraising campaign from application database 214. In certain embodiments, the one or more augmented reality elements may comprise a button or other graphical element comprising an embedded hyperlink (e.g., a link to a webpage or application page) configured to direct end user 23 to a payment form associated with the charitable fundraising campaign. In accordance with certain embodiments, augmented reality application 218 may be configured to render the payment form within an application window of end user instance 218" in response to end user 23 tapping or clicking on the graphical element comprising the embedded hyperlink. In accordance with certain embodiments, end user instance 218" may be configured to prompt end user 23 to enter payment data (e.g., credit card information or banking information) into the payment form. End user instance 218" may be configured to communicate the payment data to payment gateway 230 to process a payment transaction for the charitable fundraising campaign. Payment gateway 230 may communicate the transaction data to application server 210 and application server 210 may store the transaction data in application database 214. In accordance with certain aspects of the present disclosure, augmented reality application 218 may be configured to update the one or more augmented reality elements at end user instance 218" in real-time in response to receiving the transaction data at application server 210.

Figure 3:
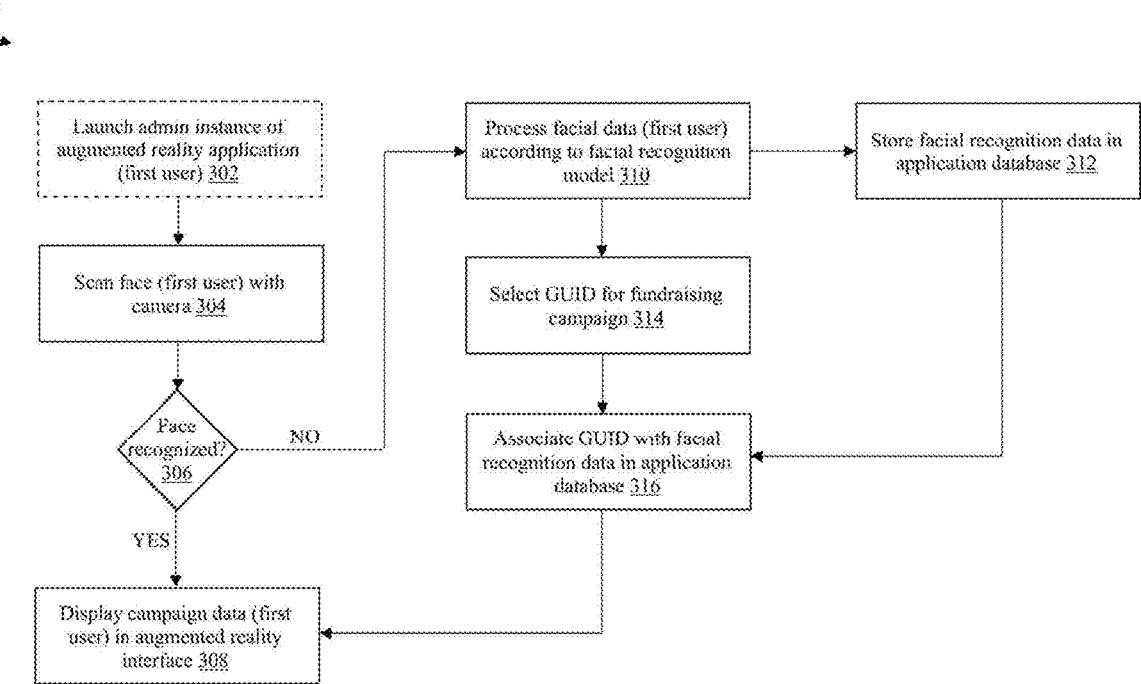
FIG. 3 is a functional block diagram of a routine of an augmented reality system for facilitating online transactions, in accordance with certain aspects of the present disclosure.

Referring now to FIG. 3, a functional block diagram of a routine 300 of an augmented reality system for facilitating online transactions is shown. In accordance with certain aspects of the present disclosure, routine 300 may be embodied as one or more operations of system 200, as shown and described in FIG. 2. In accordance with certain aspects of the present disclosure, routine 300 may be initiated upon performing one or more steps or operations to launch an instance of an augmented reality application (302). The instance of the augmented reality application may be executed at a client device (e.g., a personal computing device) of a first user. In accordance with certain aspects of the present disclosure, the first user may comprise a user associated with a charitable fundraising campaign; e.g., a donor, an administrator, a supporter, a social media influencer and the like. In accordance with certain embodiments, routine 300 may comprise one or more one or more steps or operations (e.g., workflow) for scanning or taking a digital photograph of the first user's face with a digital camera (304). Routine 300 may comprise one or more data processing operations to determine whether the first user's face comprises a known face in an application database (306). If YES (i.e., the first user's face is recognized as a known face), routine 300 may proceed by displaying fundraising campaign data (e.g., total funds raised) at an augmented reality interface of the instance of the augmented reality application (308). In accordance with certain embodiments, the augmented reality interface comprises a real-time view of the digital camera. In accordance with certain embodiments, the fundraising campaign data may be rendered in the real-time view of the digital camera to comprise the augmented reality interface. If NO (i.e., the first user's face is not recognized as a known face), routine 300 may proceed by executing one or more steps or operations for processing the data from the scan or digital image of the first user's face according to a facial recognition processing model configured to analyze and extract one or more features of the first user's face in order to identify the first user's face in one or more subsequent digital images (310). Routine 300 may comprise one or more steps or operations for storing the facial recognition data for the first user, including one or more outputs from the facial recognition model, in an application database and/or facial image recognition database (312). Routine 300 may proceed by executing one or more steps or operations for selecting a globally unique identifier (GUID) or other identifier (ID) for identifying the charitable fundraising campaign from the application database (314). In accordance with certain embodiments, the GUID or ID may be selected by the first user within a graphical user interface of the augmented reality application. Routine 300 may proceed by executing one or more steps or operations for associating the GUID or ID with the facial recognition data for the first user in the application database (316). In accordance with certain aspects of the present disclosure, an output of step 316 may enable the augmented reality application to link the first user's identity to the identified charitable fundraising campaign such that upon receiving facial image data for the first user in a second or subsequent instance, the augmented reality application is configured to retrieve, render and display the campaign data at the augmented reality interface (308).

Figure 4:
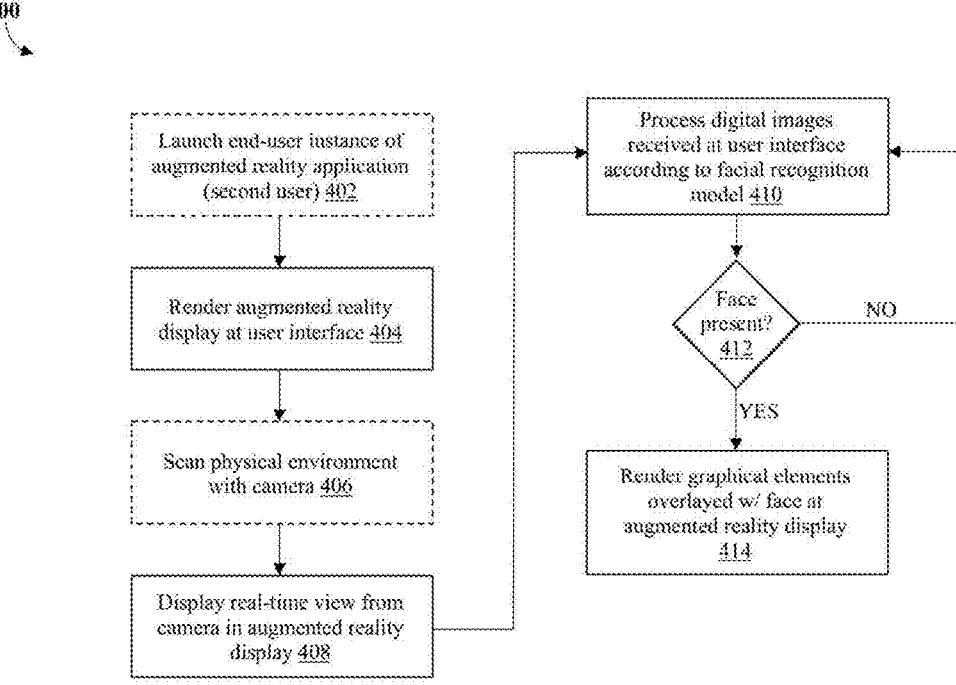
FIG. 4 is a functional block diagram of a routine of an augmented reality system for facilitating online transactions, in accordance with certain aspects of the present disclosure.

Referring now to FIG. 4, a functional block diagram of a routine 400 of an augmented reality system for facilitating online transactions is shown. In accordance with certain aspects of the present disclosure, routine 400 may be embodied as one or more operations of system 200, as shown and described in FIG. 2. In accordance with certain aspects of the present disclosure, routine 400 may be successive or sequential to one or more steps or operations of routine 300, as shown and described in FIG. 3. In accordance with certain aspects of the present disclosure, routine 400 may be initiated upon executing one or more steps or operations to launch an end-user instance of an augmented reality application at an end user device (402). The end user device may comprise a smartphone or personal computing device. The end user device may be associated with an end user that is different from the first user described in FIG. 3; i.e., a second user. In accordance with certain aspects of the present disclosure, the end user may comprise an actual or potential donor for the charitable fundraising campaign described in FIG. 3. In accordance with certain aspects of the present disclosure, routine 400 may proceed by executing one or more steps or operations for rendering an augmented reality display at the user interface of the augmented reality application (404). Routine 400 may continue with the second user scanning a physical environment with a camera of the end user device to capture digital images (i.e., a live feed) of one or more subjects present in the physical environment; e.g., one or more human subjects (406). Routine 400 may proceed by executing one or more steps or operations for displaying a real-time view from the camera in the augmented reality display at the user interface (408). Routine 400 may proceed by executing one or more steps or operations for processing the digital images displayed at the real-time view from the camera in the augmented reality display according to a facial recognition processing model (410). In certain embodiments, the facial recognition processing model may be the facial recognition processing model described in FIG. 3. In accordance with certain aspects of the present disclosure, routine 400 may comprise a data processing step to determine whether a human face is present in the digital images displayed at the real-time view from the camera in the augmented reality display (412). If NO (i.e., a human face is not recognized), routine 400 continually processes the digital images in real-time, at step 410, to determine whether a human face becomes present at any successive timepoints. If YES (i.e., a human face is recognized), routine 400 executes one or more steps or operations, in real-time, to render one or more graphical elements (i.e., augmented reality elements) overlayed with the face (i.e., above, below or adjacent to the face) in the augmented reality display (414).

Figure 5:
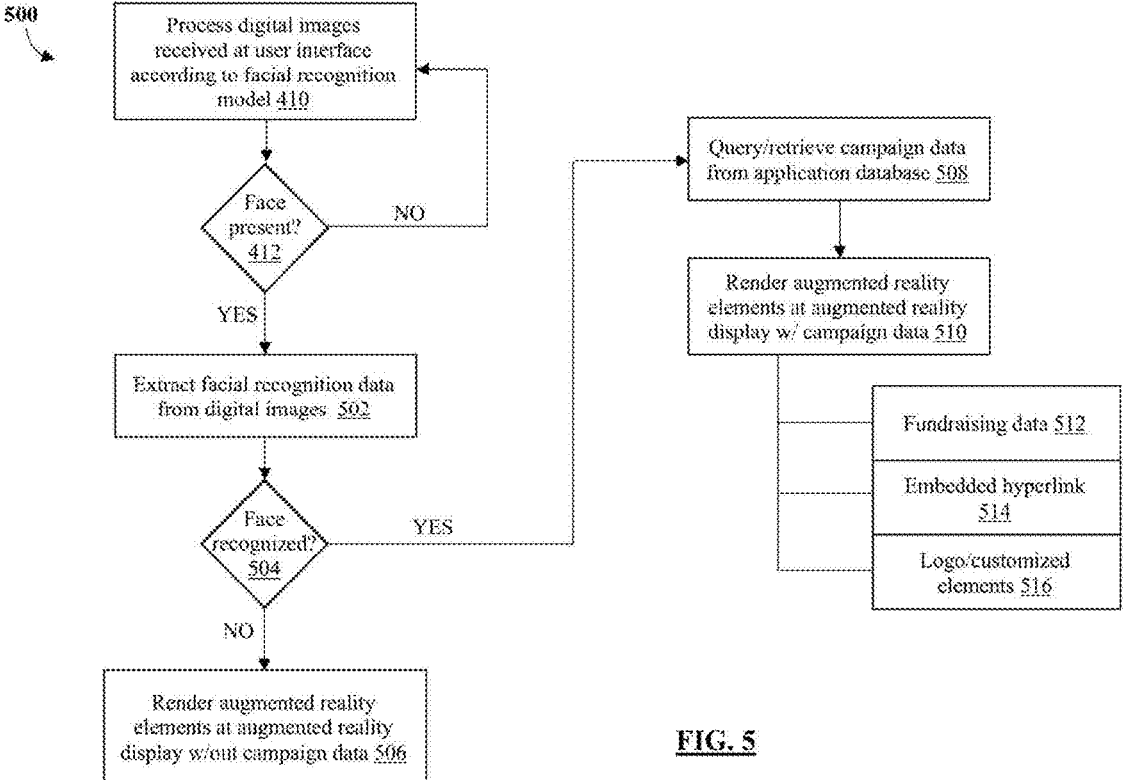
FIG. 5 is a functional block diagram of a routine of an augmented reality system for facilitating online transactions, in accordance with certain aspects of the present disclosure.

Referring now to FIG. 5, a functional block diagram of a routine 500 of an augmented reality system for facilitating online transactions is shown. In accordance with certain aspects of the present disclosure, routine 500 may be embodied as one or more operations of system 200, as shown and described in FIG. 2. In accordance with certain aspects of the present disclosure, routine 500 may be successive or sequential to one or more steps or operations of routines 300-400, as shown and described in FIGS. 3-4. In accordance with certain aspects of the present disclosure, routine 500 is a continuation of routine 400, as shown and described in FIG. 4. In accordance with certain aspects of the present disclosure, routine 500 comprises one or more system operations within an end user instance of the augmented reality application (e.g., end user instance 218" of augmented reality application 218, as shown and described in FIG. 2).

In accordance with certain aspects of the present disclosure, routine 500 may comprise one or more steps or operations for processing the digital images displayed at the real-time view from the camera in the augmented reality display according to the facial recognition processing model, in accordance with step 410 of FIG. 4. In accordance with certain aspects of the present disclosure, routine 500 may comprise a data processing step, in accordance with step 412 of FIG. 4, to determine whether a human face is present in the digital images displayed at the real-time view from the camera in the augmented reality display. If NO (i.e., a human face is not recognized), routine 500 continually processes the digital images in real-time, in accordance with step 410 of FIG. 4, to determine whether a human face becomes present at any successive timepoints. If YES (i.e., a human face is recognized), routine 500 may continue by performing one or more steps or operations for extracting, according to the facial recognition processing model, facial recognition data from the digital images (502). Routine 500 may comprise a data processing step to determine whether the face is recognized (i.e., associated with a known face in the application database) based on the extracted facial recognition data (504). If NO (i.e., the face is not associated with a known face in the application database), then routine 500 proceeds by executing one or more steps or operations for rendering augmented reality elements without fundraising campaign data at the augmented reality display of the augmented reality application (506). If YES, (i.e., the face is associated with a known face in the application database), then routine 500 proceeds by executing one or more steps or operations for querying and retrieving campaign data from the application database (508). Routine 500 may proceed by executing one or more steps or operations for rendering augmented reality elements comprising fundraising campaign data at the augmented reality display of the augmented reality application (510).

In accordance with certain aspects of the present disclosure, the augmented reality elements may comprise one or more graphical elements comprising the fundraising campaign data. For example, the augmented reality elements may comprise a numerical display of fundraising data 512 rendered above, below and/or adjacent to the known face in the augmented reality display. Alternatively, or additionally, the augmented reality elements may comprise an embedded hyperlink 514 rendered above, below and/or adjacent to the known face in the augmented reality display. In certain embodiments, embedded hyperlink 514 may be embedded in a graphical element such as a button. In certain embodiments, embedded hyperlink 514 may comprise a link to a webpage or application page comprising a payment form associated with the charitable fundraising campaign. Alternatively, or additionally, the augmented reality elements may comprise a logo or other customized graphical element 516 (e.g., a photo or a customized message) for an organization associated with the charitable fundraising campaign and/or the known user.

Figure 6:
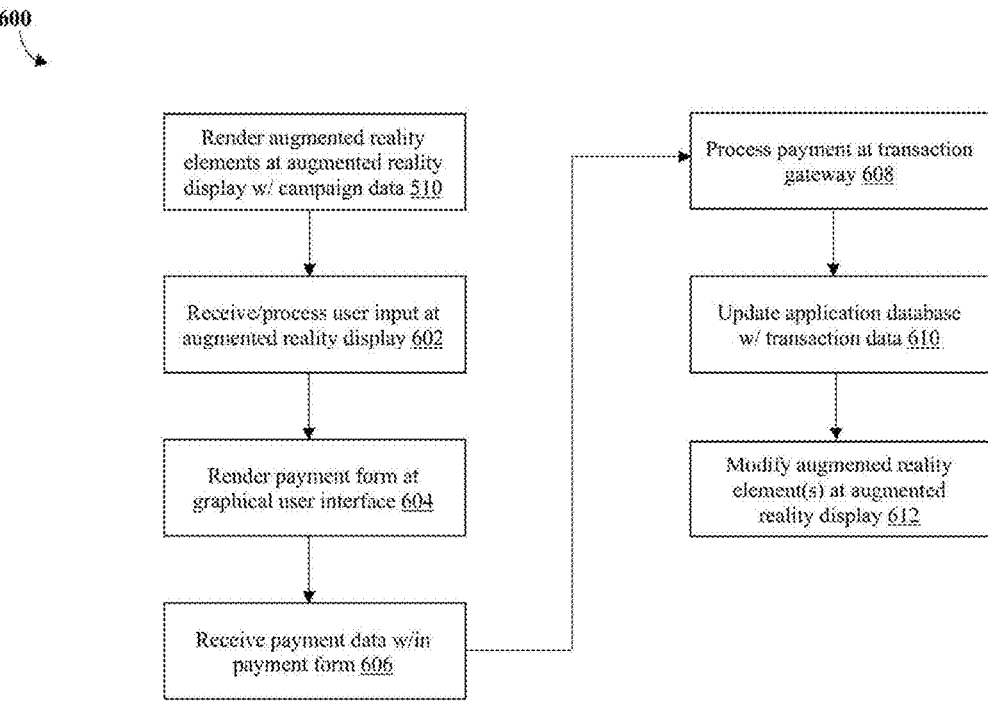
FIG. 6 is a functional block diagram of a routine of an augmented reality system for facilitating online transactions, in accordance with certain aspects of the present disclosure.

Referring now to FIG. 6, a functional block diagram of a routine 600 of an augmented reality system for facilitating online transactions is shown. In accordance with certain aspects of the present disclosure, routine 600 may be embodied as one or more operations of system 200, as shown and described in FIG. 2. In accordance with certain aspects of the present disclosure, routine 600 may be successive or sequential to one or more steps or operations of routines 300-500, as shown and described in FIGS. 3-5. In accordance with certain aspects of the present disclosure, routine 600 is a continuation of routine 500, as shown and described in FIG. 5. In accordance with certain aspects of the present disclosure, routine 600 comprises one or more system operations within an end user instance of the augmented reality application (e.g., end user instance 218" of augmented reality application 218, as shown and described in FIG. 2). In accordance with certain aspects of the present disclosure, routine 600 may comprise one or more of steps 510-614 for rendering a payment form at the graphical user interface of the augmented reality application, processing a payment transaction and updating one or more augmented reality elements in the augmented reality display.

In accordance with certain aspects of the present disclosure, routine 600 may begin by executing one or more steps or operations for rendering augmented reality elements comprising fundraising campaign data at the augmented reality display of the augmented reality application, in accordance with step 510 of FIG. 5. Routine 600 may proceed by executing one or more steps or operations for receiving and processing a user-generated input from an end user at the augmented reality display (602). In accordance with certain embodiments, the user-generated input may comprise clicking or tapping on an embedded hyperlink in the augmented reality display with an input device, such as a touch screen interface or mouse. Routine 600 may proceed, in response to an output of step 602, by executing one or more steps or operations for rendering a payment form at the graphical user interface of the augmented reality application (604). Routine 600 may proceed by executing one or more steps or operations for receiving, in response to a user-generated input at the graphical user interface of the augmented reality application, payment data (e.g., credit card billing data and/or banking account information) within the payment form rendered at the graphical user interface (606). Routine 600 may continue, in response to the end user selecting an interface element operable to submit or process the payment data (e.g., a "pay now" button), by executing one or more steps or operations for communicating the transaction data to a payment gateway (e.g., through a data transfer protocol via an Internet connection) and processing the payment data at the transaction gateway to complete a financial transaction using the payment data (608). Routine 600 may proceed by executing one or more steps or operations for communicating the transaction data from the payment gateway to the application server and updating the application database with the transaction data (610). In accordance with certain embodiments, step 610 may comprise updating one or more objects/attributes in the application database for the charitable fundraising campaign; for example, a total amount of funds raised and/or a total amount of funds raised attributable to one or more known users. In response to an output of step 610, routine 600 may proceed by executing one or more steps or operations for modifying one or more augmented reality elements at the augmented reality display (612). In accordance with certain aspects of the present disclosure, an output of step 612 may comprise one or more operations for modifying a graphical element, such as a display of total funds raised above the face of the known user. In certain embodiments, an output of step 612 may comprise rendering one or more animations (e.g., fireworks) and/or one or more audio output (e.g., a recorded message) and/or presenting one or more new graphical elements at the augmented reality display (e.g., stars, badges, etc.).

Figure 7:
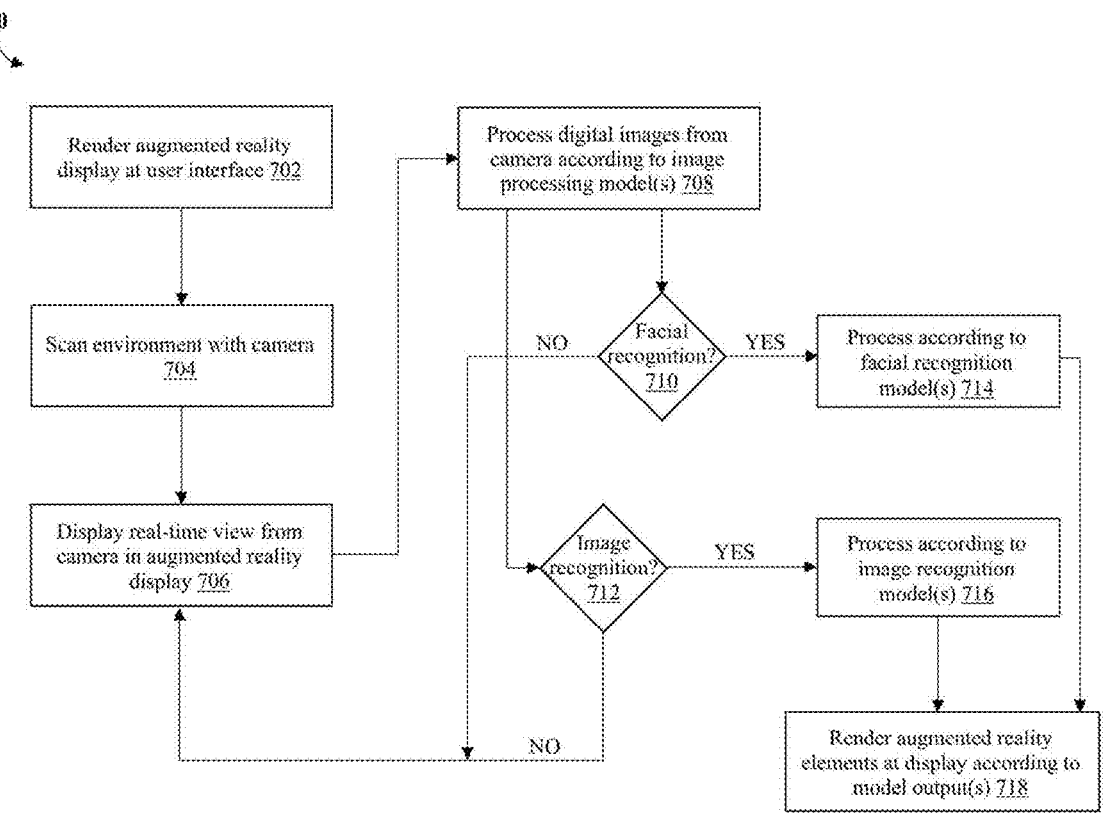
FIG. 7 is a functional block diagram of a routine of an augmented reality system for facilitating online transactions, in accordance with certain aspects of the present disclosure.

Referring now to FIG. 7, a functional block diagram of a routine 700 of an augmented reality system for facilitating online transactions is shown. In accordance with certain aspects of the present disclosure, routine 700 may be embodied as one or more operations of system 200, as shown and described in FIG. 2. In accordance with certain aspects of the present disclosure, routine 700 may be successive or sequential to one or more steps or operations of routines 300-600, as shown and described in FIGS. 3-6. In accordance with certain aspects of the present disclosure, routine 700 may comprise one or more steps or operations 702-718 for processing one or more faces and/or one or more images from a physical environment (e.g., a landmark, a street sign, a façade of a building, etc.) to render one or more augmented reality elements at an augmented reality display. In accordance with certain aspects of the present disclosure, routine 700 may comprise one or more system operations within an end user instance of the augmented reality application (e.g., end user instance 218" of augmented reality application 218, as shown and described in FIG. 2).

In accordance with certain aspects of the present disclosure, routine 700 may comprise one or more steps or operations for rendering an augmented reality display at a user interface of an augmented reality application (702). In accordance with certain embodiments, the augmented reality display comprises a real-time view of images captured by a digital camera of an end user device (e.g., a smartphone with an integrated camera). Routine 700 may continue by executing one or more steps or operations for scanning a physical environment with the digital camera of the end user device (704). Routine 700 may continue by executing one or more steps or operations for rendering/displaying a real-time view from the digital camera in the augmented reality display at a user interface of an augmented reality application (706). Routine 700 may continue by executing one or more steps or operations for continuously processing, in real time, digital images received from the digital camera according to one or more image recognition processing model(s) and/or facial recognition processing model(s) (708). In accordance with certain aspects of the present disclosure, routine 700 may comprise one or more data processing steps 710,712. In accordance with certain aspects of the present disclosure, data processing steps 710,712 may be executed successively or concomitantly. In accordance with certain embodiments, data processing step 710 may comprise one or more steps or operations for processing the digital images received at the digital camera to determine if one or more human faces are present in the real-time view at the augmented reality display. If YES, routine 700 may process the facial data from the one or more human faces present in the real-time view at the augmented reality display according to one or more facial recognition processing model (714). If NO, routine 700 may continue by proceeding to step 706. In accordance with certain embodiments, data processing step 712 may comprise one or more steps or operations for processing the digital images received at the digital camera to determine if one or more images are recognized according to at least one image recognition model (e.g., optical character recognition, image recognition of one or more landmarks, etc.). If YES, routine 700 may process the image data for the one or more recognized images according to one or more image recognition processing model (716). If NO, routine 700 may continue by proceeding to step 706. In accordance with certain aspects of the present disclosure, routine 700 may continue by executing one or more steps or operations for rendering one or more augmented reality elements at the augmented reality display according to one or more model outputs from steps 714,716 (718).

Figure 8:
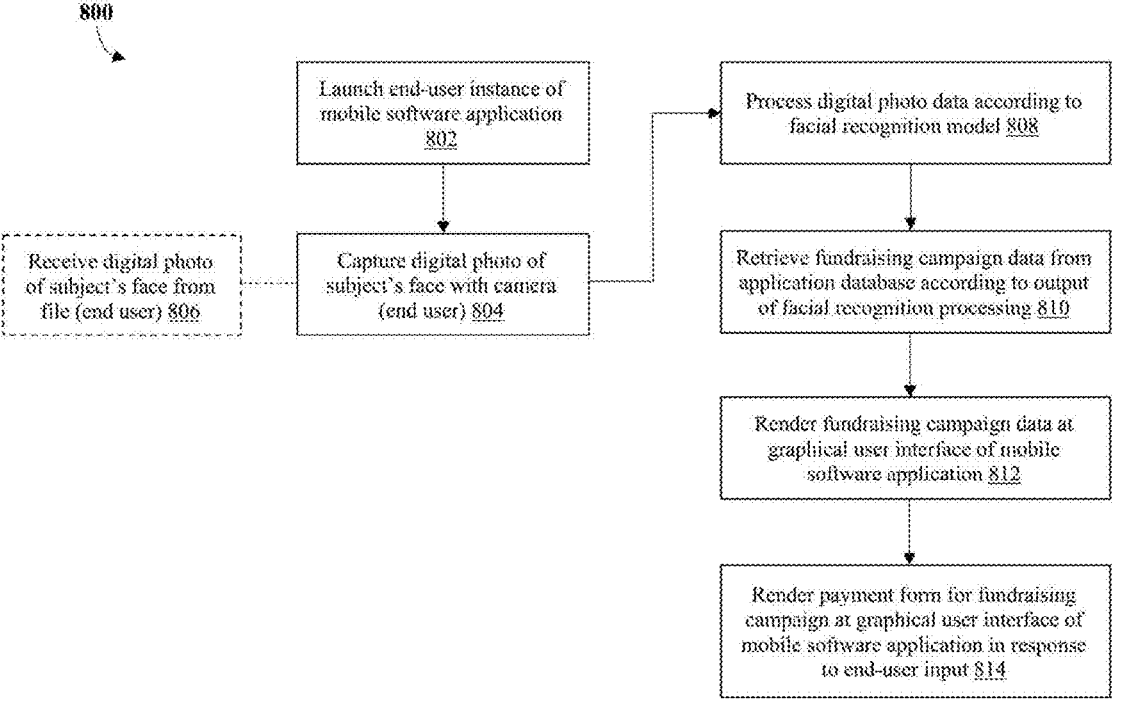
FIG. 8 is a functional block diagram of a routine of an augmented reality system for facilitating online transactions, in accordance with certain aspects of the present disclosure.

Referring now to FIG. 8, a functional block diagram of a routine 800 of an augmented reality system for facilitating online transactions is shown. In accordance with certain aspects of the present disclosure, routine 800 may be embodied as one or more operations of system 200, as shown and described in FIG. 2. In accordance with certain aspects of the present disclosure, routine 800 may be successive or sequential to one or more steps or operations of routines 300-700, as shown and described in FIGS. 3-7. In accordance with certain aspects of the present disclosure, routine 800 may comprise one or more system operations within an end user instance of the augmented reality application (e.g., end user instance 218" of augmented reality application 218, as shown and described in FIG. 2). In accordance with certain aspects of the present disclosure, routine 800 may comprise one or more steps or operations 802-814 for processing a graphical user interface of an end user application in response to processing a digital image (e.g., photograph) of a human face.

In accordance with certain aspects of the present disclosure, routine 800 may comprise one or more steps or operations for launching an end user instance of a mobile software application at a display of an end user device (e.g., a smartphone) (802). Routine 800 may continue by executing one or more steps or operations for capturing, in response to a user-generated input by an end user of the mobile software application, a digital photo of a human subject's face with a camera of the end user device (804). In accordance with certain aspects of the present disclosure, routine 800 may, additionally or alternatively to step 804, comprise one or more steps or operations for receiving a digital photo of a human subject's face at the end user instance of the mobile software application from local storage on the end user's device and/or downloading the digital photo from an external location, such as a webpage on the Internet (806). In accordance with certain aspects of the present disclosure, routine 800 may continue by executing one or more steps or operations for processing the digital photo data according to at least one facial recognition model (808). In certain embodiments, the facial recognition model may be executed on a facial recognition engine residing on a facial recognition server. In other embodiments, the facial recognition model may be executed on a remote application server or on a local processor of the end user device. In accordance with certain aspects of the present disclosure, routine 800 may continue by executing one or more steps or operations for retrieving fundraising campaign data from an application database according to an output from step 808 (810). In accordance with certain aspects of the present disclosure, step 810 may comprise one or more steps or operations for identifying a fundraising campaign based on an identity of the human subject from a facial recognition database.

Routine 800 may continue by executing one or more steps or operations for rendering the fundraising campaign data retrieved at the application database at the graphical user interface of the mobile software application (812). The fundraising data may comprise one or more graphical elements associated with the fundraising campaign (e.g., a logo of an organization) and/or a text-based display of a total amount of funds raised during the charitable fundraising campaign and/or a total amount of funds attributable to the identified human subject during the charitable fundraising campaign. Routine 800 may continue by executing one or more steps or operations for rendering a payment form for the charitable fundraising campaign at the graphical user interface of the mobile software application in response to a user-generated input by the end user at the graphical user interface (814).

Referring now to FIG. 9, a process flow diagram of a method 900 for facilitating online transactions in an augmented reality interface is shown. In accordance with certain aspects of the present disclosure, method 900 may be embodied in one or more routines 300-800, as shown and described in FIGS. 3-8, and/or may be embodied in one or more system elements of operations of system 200, as shown and described in FIG. 2. In accordance with certain aspects of the present disclosure, method 900 may begin by performing one or more steps or operations for receiving (e.g., via a client-side instance of augmented reality application executing on a client device) a digital image of a human subject's face (Step 902). In accordance with certain aspects of the present disclosure, the human subject's face is associated with a first user of an augmented reality application (e.g., client-user 21 of FIG. 2). Method 900 may proceed by performing one or more steps or operations for processing (e.g., with a facial recognition processing engine communicably engaged with an application server and/or a client device) the digital image of the face of the first user to extract one or more features of the first user's face (Step 904). In certain embodiments, the one or more features of the first user's face are analyzed according to a facial recognition processing model. Method 900 may proceed by performing one or more steps or operations for associating (e.g., via one or more operations of an augmented reality application executing on the application server) an output of the facial recognition processing model with a globally unique identifier in an application database (Step 906). In accordance with certain aspects of the present disclosure, the globally unique identifier is associated with a charitable fundraising campaign. The charitable fundraising campaign may be associated with the first user in the application database; e.g., an identity of the first user may be linked or tagged to one or more aspects of the charitable fundraising campaign. Method 900 may proceed by performing one or more steps or operations for presenting (e.g., via a display of a mobile electronic device) an end user instance of a mobile software application comprising a graphical user interface to a second user (e.g., end user instance 218" of augmented reality application 218) (Step 908). In accordance with certain embodiments, the second user may comprise an end user of an augmented reality application (e.g., end user 23 of FIG. 2) and may comprise a different user to the first user. Method 900 may proceed by performing one or more steps or operations for scanning a physical environment with a camera of the end user device and displaying (e.g., at a display of the mobile electronic device) a real-time view of the camera at the graphical user interface of the end user instance of to the second user (Step 910). In accordance with certain aspects of the present disclosure, the real-time view of the camera comprises an augmented reality display comprising a real-time view of the physical environment. Method 900 may proceed by performing one or more steps or operations for processing (e.g., with the facial recognition processing engine) digital images received at the real-time view of the camera according to the facial recognition processing model (Step 912). In accordance with certain embodiments, the facial recognition processing model may be configured to recognize at least one face from the digital images received at the real-time view of the camera and determine whether the at least one face comprises the first user's face (or another known user's face). Method 900 may proceed by performing one or more steps or operations for embedding (e.g., via the end user instance of the augmented reality application) at least one graphical element in the augmented reality display in response to recognizing the at least one face (Step 914). In certain embodiments, the at least one graphical element may be embedded in the augmented reality display in real-time. In accordance with embodiments, upon determining the at least one face comprises the first user's face, the at least one graphical element may be configured to comprise a hyperlink configured to access a transaction form (e.g., a payment form) associated with the charitable fundraising campaign.

Referring now to FIG. 10, a process flow diagram of a method 1000 for facilitating online transactions in an augmented reality interface is shown. In accordance with certain aspects of the present disclosure, method 1000 may be embodied in one or more routines 300-800, as shown and described in FIGS. 3-8, and/or may be embodied in one or more system elements of operations of system 200, as shown and described in FIG. 2. In accordance with certain aspects of the present disclosure, method 1000 may be successive or sequential to one or more steps or operations of method 900 of FIG. 9. In accordance with certain aspects of the present disclosure, method 1000 may begin by performing one or more steps or operations for rendering (e.g., with the end user instance of the augmented reality application) a graphical element comprising a real-time fundraising total for the charitable fundraising campaign in augmented reality display (Step 1002). In accordance with certain embodiments, the graphical element is rendered near the known user's face in the augmented reality display. In certain embodiments, the graphical element is responsive; i.e., it moves to maintain a relative position to the known user's face as the known user moves in the augmented reality display. Method 1000 may proceed by performing one or more steps or operations for embedding a hyperlink for the payment form for charitable fundraising campaign in the graphical element (Step 1004). In accordance with certain embodiments, the hyperlink may be configured to access a transaction form associated with the charitable fundraising campaign. Method 1000 may proceed by performing one or more steps or operations for rendering (e.g., with the end-user instance of the augmented reality application) a payment form at the graphical user interface in response to user tapping/clicking the graphical element comprising the embedded hyperlink (Step 1006). In accordance with certain embodiments, method 1000 may proceed by performing one or more steps or operations for receiving (e.g., in response to a user-generated input) a plurality of payment data in the payment form at the graphical user interface and processing a payment transaction for the end user via a payment gateway (e.g., a payment gateway communicably engaged with the application server) (Step 1008). Method 1000 may proceed by performing one or more steps or operations for updating the application database with transaction data received from the payment gateway in response to successfully processing a transaction from the end user's payment data (Step 1010). In accordance with certain aspects of the present disclosure, method 1000 may proceed by performing one or more steps or operations for modifying the graphical element at the augmented reality display in real-time in response to executing the transaction at the payment gateway (Step 1012). In certain embodiments, step 1012 may comprise updating the graphical element to display a real-time total of the fundraising data for the charitable fundraising campaign.

Figure 11:
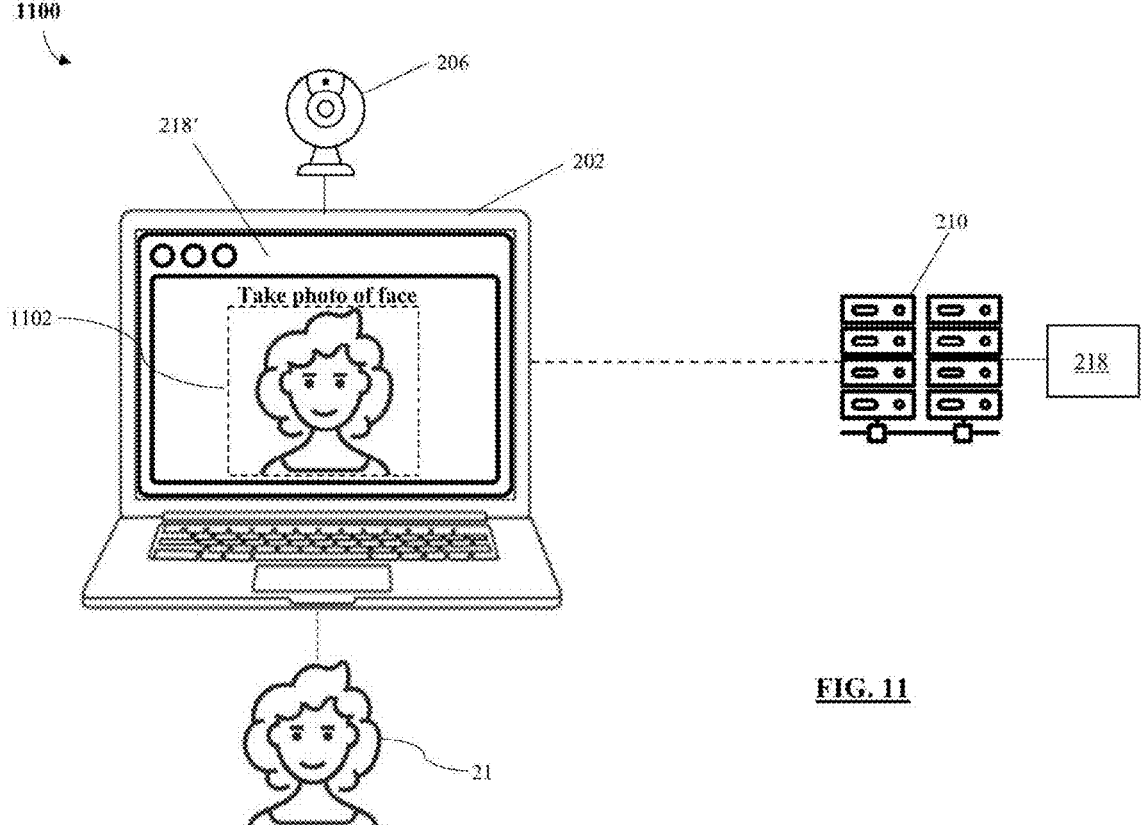
FIG. 11 is a functional illustration of an augmented reality system for facilitating online transactions, in accordance with certain aspects of the present disclosure.

Referring now to FIG. 11, a functional illustration 1100 of an augmented reality system for facilitating online transactions is shown. In accordance with certain aspects of the present disclosure, the augmented reality system may comprise system 200 as shown and described in FIG. 2. In accordance with certain aspects of the present disclosure, the augmented reality system is operably configured wherein a client-side instance 218' of augmented reality application 218 is provided to client device 202 via a data transfer interface with application server 210. A client user 21 (e.g., a first known user) may execute a workflow in client-side instance 218' of augmented reality application 218 to take a digital photograph 1102 of the client user's face via digital camera 206.

Figure 12:
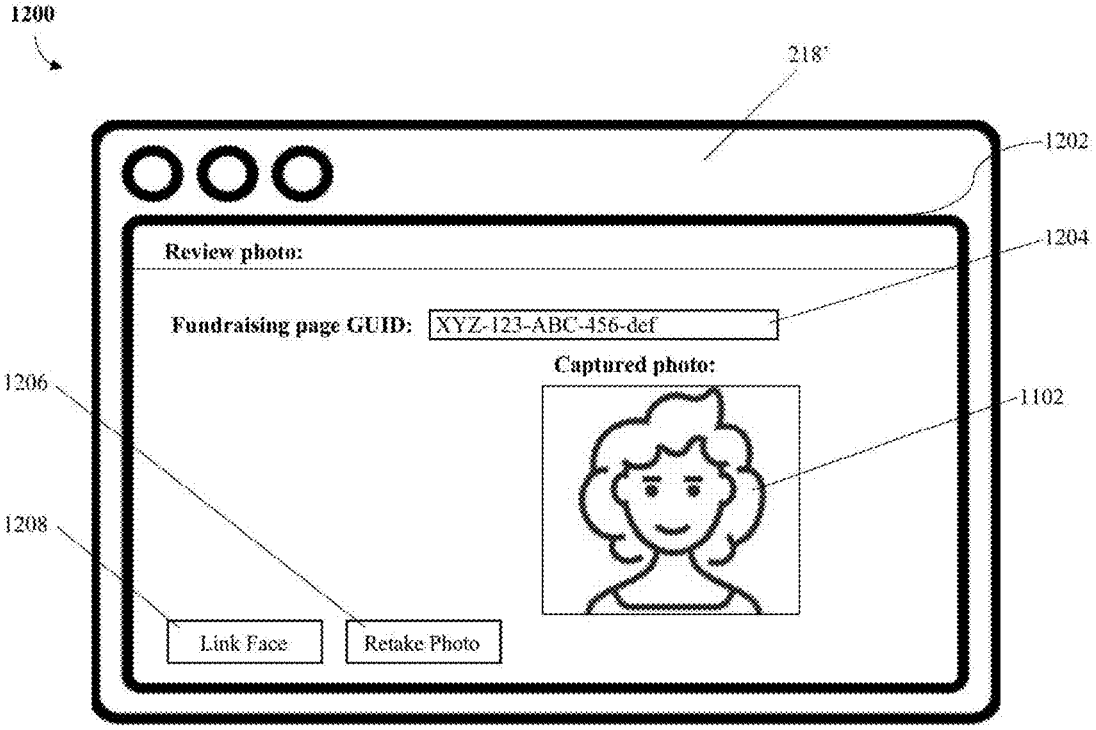
FIG. 12 is an illustration of a graphical user interface of an augmented reality system for facilitating online transactions, in accordance with certain aspects of the present disclosure.

Referring now to FIG. 12, an illustration 1200 of a graphical user interface of an augmented reality system for facilitating online transactions is shown. In accordance with certain aspects of the present disclosure, the augmented reality system may comprise system 200 as shown and described in FIG. 2. In accordance with certain aspects of the present disclosure, client-side instance 218' may comprise a graphical user interface 1202 comprising a workflow for associated a fundraising page with a known user. In accordance with certain embodiments, the client user may enter a fundraising page GUID 1204 into an input field of graphical user interface 1202. The captured digital photograph 1102 may be displayed in the user interface 1202 such that the user may have a visual display of the face that the user intends to link with the specified fundraising page. The graphical user interface 1202 may comprise one or more action buttons 1206,1208 configured to perform one or more actions within the user interface 1202. In accordance with certain embodiments, a first action button 1206 may be configured to enable the user to retake or change the selected digital photograph 1102. In certain embodiments, a second action button 1208 may be configured to perform one or more operations within client user instance 218' to send the data received at user interface 1202 to the application server. The application server may be configured to process the digital photograph 1102 according to a facial recognition processing model (e.g., via a facial recognition processing engine) to extract one or more unique facial characteristics to identify the client user 21 in a facial recognition database.

Figure 13:
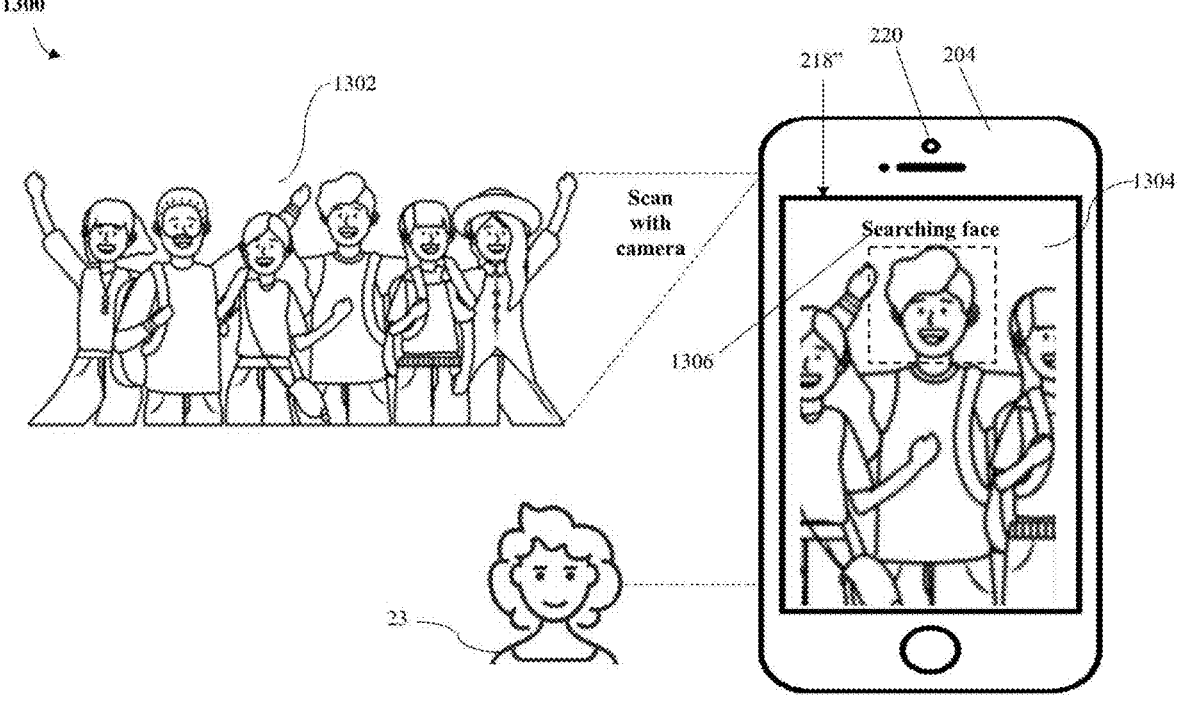
FIG. 13 is a functional illustration of an augmented reality system for facilitating online transactions, in accordance with certain aspects of the present disclosure.

Referring now to FIG. 13, a functional illustration 1300 of an augmented reality system for facilitating online transactions is shown. In accordance with certain aspects of the present disclosure, the augmented reality system may comprise system 200 as shown and described in FIG. 2. In accordance with certain aspects of the present disclosure, illustration 1300 depicts a use case in which an end user 23 may view an augmented reality display 1304 of a physical environment 1302 within an end user instance 218" of an augmented reality application. In accordance with certain aspects of the present disclosure, end user 23 may scan a physical environment 1302 with a camera 220 of an end user device 204 (e.g., a smartphone). The physical environment 1302 may comprise one or more human subjects; for example, a plurality of runners at a race or a plurality of presenters on stage at a live event. The augmented reality display 1304 may display a live view from the camera 220 to the end user 23. The augmented reality display 1304 may comprise a first augmented reality element 1306 comprising a graphical indication of a selection of a human subject's face from the physical environment 1302 and, optionally, a graphical indication that the end user instance 218" of the augmented reality application is searching the human subject's face according to the facial image processing model.

Figure 14:
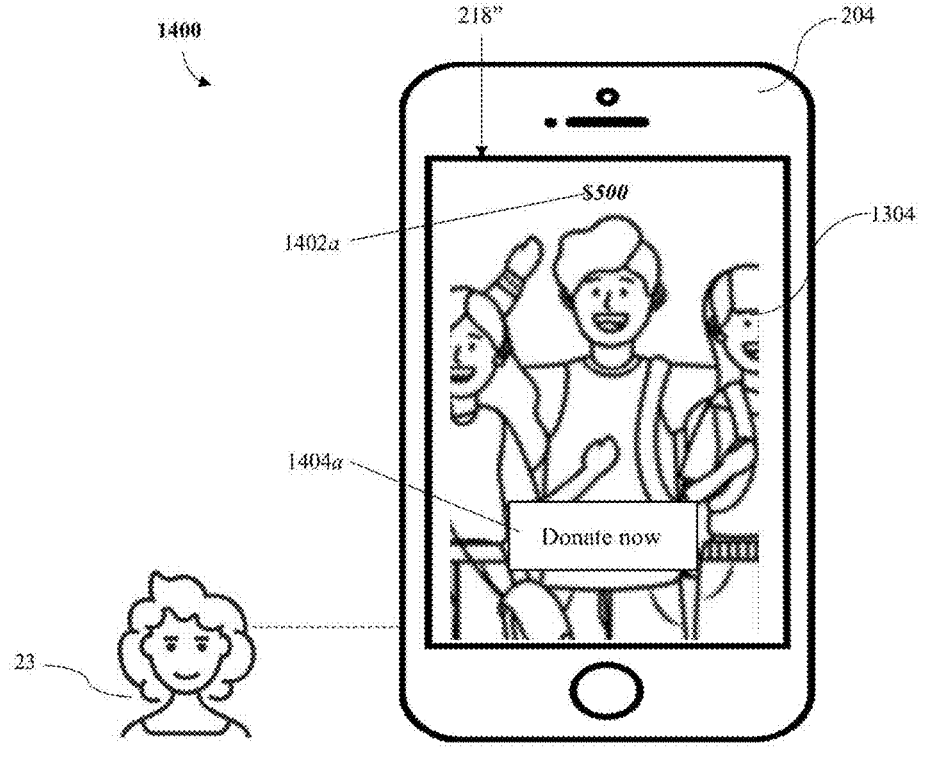
FIG. 14 is an illustration of a graphical user interface of an augmented reality system for facilitating online transactions, in accordance with certain aspects of the present disclosure.

Referring now to FIG. 14, an illustration 1400 of a graphical user interface of an augmented reality system for facilitating online transactions is shown. In accordance with certain aspects of the present disclosure, the augmented reality system may comprise system 200 as shown and described in FIG. 2. In accordance with certain aspects of the present disclosure, illustration 1400 depicts a state of end user instance 218" in which the end user instance 218" of the augmented reality application has identified a known user at the augmented reality display 1304. In accordance with certain embodiments, the end user instance 218" of the augmented reality application may render a second augmented reality element 1402a and a third augmented reality element 1404a. In accordance with certain embodiments, second augmented reality element 1402a may comprise a text-based display of a fundraising total for a charitable fundraising campaign associated with the known user present in the augmented reality display. In accordance with certain aspects of the present disclosure, the second augmented reality element 1402a may be rendered adjacent to the known user's face such that the end user 23 may clearly associate the second augmented reality element 1402a with the known user. In accordance with certain embodiments, the third augmented reality element 1404a may comprise an action button (e.g., a "Donate now" button). In accordance with certain aspects of the present disclosure, the third augmented reality element 1404a may comprise an embedded hyperlink such that when the end user 23 taps the third augmented reality element 1404a, the end user instance 218" of the augmented reality application is configured to render a new application page at the display of the end user device 204.

Figure 15:
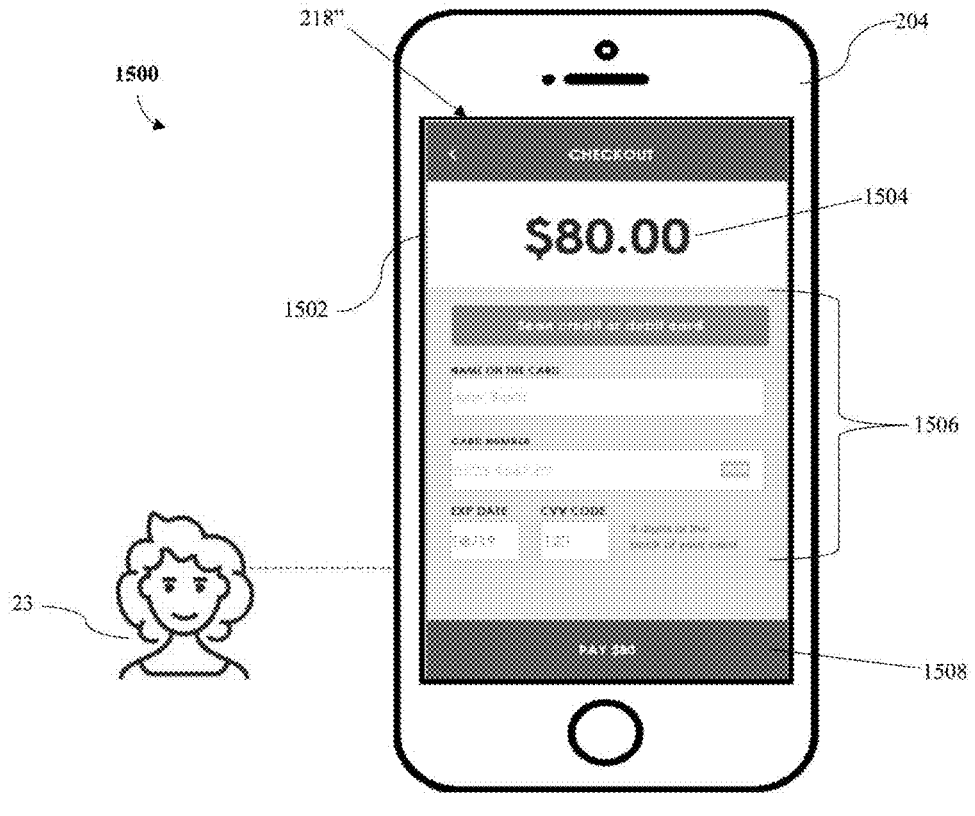
FIG. 15 is an illustration of a graphical user interface of an augmented reality system for facilitating online transactions, in accordance with certain aspects of the present disclosure.

Referring now to FIG. 15, an illustration 1500 of a graphical user interface of an augmented reality system for facilitating online transactions is shown. In accordance with certain aspects of the present disclosure, the augmented reality system may comprise system 200 as shown and described in FIG. 2. In accordance with certain aspects of the present disclosure, illustration 1500 depicts an application page 1502 comprising a payment form. In accordance with certain aspects of the present disclosure, the payment form is a payment form configured to process a charitable donation for the charitable fundraising campaign associated with the known user from FIG. 14. In accordance with certain embodiments, end user instance 218″ is configured to render application page 1502 in response to end user 23 tapping the third augmented reality element 1404*a*, as shown in FIG. 14. In accordance with certain embodiments, application page 1502 may comprise one or more graphical elements including a field 1504 for entering a donation amount, form elements 1506 for inputting payment data (i.e., credit card information), and an action button 1508 for processing the payment data to complete a transaction.

Figure 16:
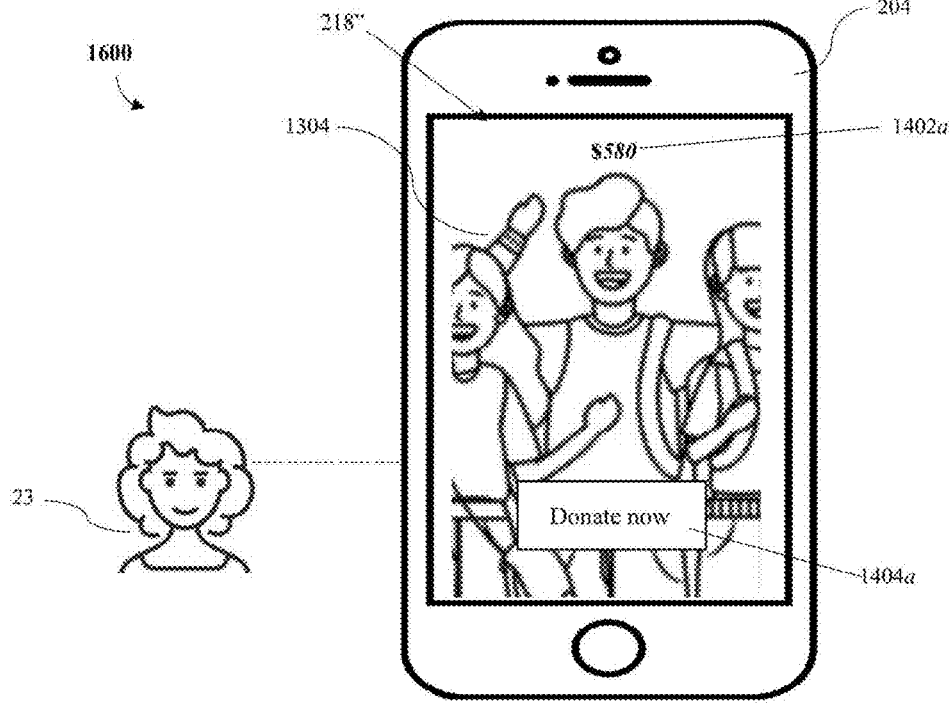
FIG. 16 is an illustration of a graphical user interface of an augmented reality system for facilitating online transactions, in accordance with certain aspects of the present disclosure.

Referring now to FIG. 16, an illustration 1600 of a graphical user interface of an augmented reality system for facilitating online transactions is shown. In accordance with certain aspects of the present disclosure, the augmented reality system may comprise system 200 as shown and described in FIG. 2. In accordance with certain aspects of the present disclosure, illustration 1600 depicts a state of end user instance 218″ in which the second augmented reality element 1402*a* is updated in real-time in response to the augmented reality application processing the transaction (e.g., for $80) from FIG. 15. As shown in FIG. 16, the second augmented reality element 1402*a* has changed from $500 (as shown in FIG. 14) to $580 (as shown in FIG. 16) to account for the $80 donation to the charitable fundraising campaign associated with the known user in the augmented reality display 1304 (as shown in FIG. 16).

Figure 17:
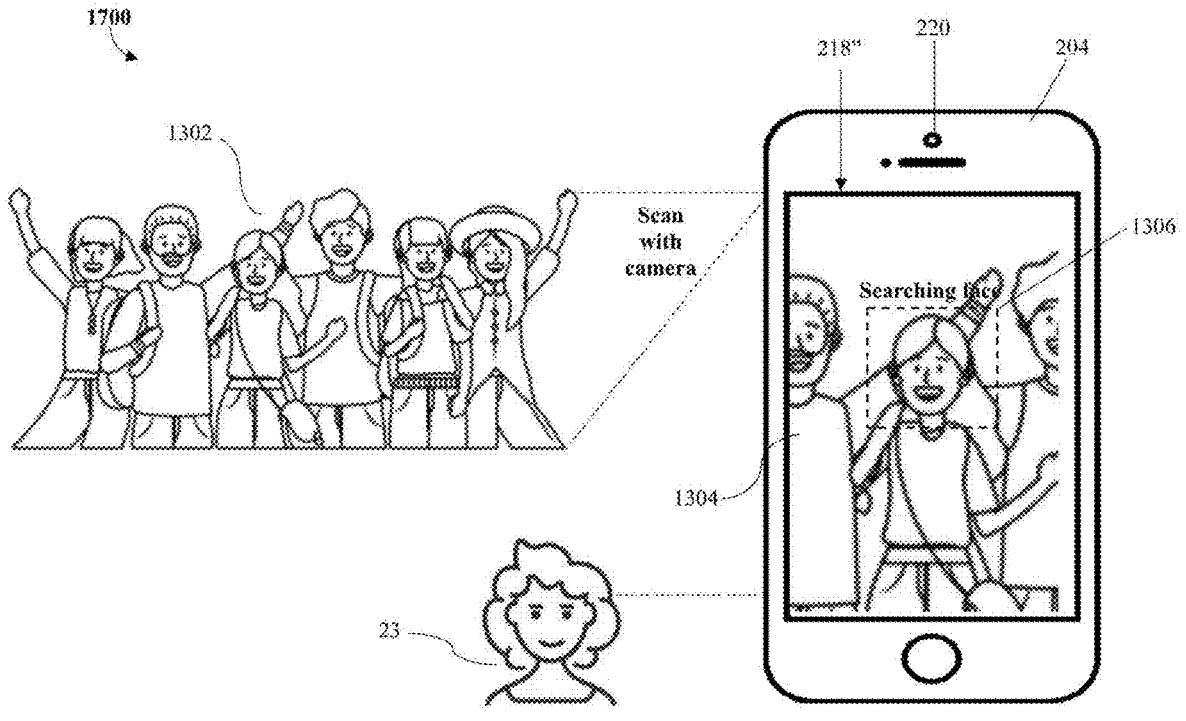
FIG. 17 is a functional illustration of an augmented reality system for facilitating online transactions, in accordance with certain aspects of the present disclosure.

Referring now to FIG. 17, a functional illustration 1700 of an augmented reality system for facilitating online transactions is shown. In accordance with certain aspects of the present disclosure, the augmented reality system may comprise system 200 as shown and described in FIG. 2. In accordance with certain aspects of the present disclosure, illustration 1700 depicts the dynamic rendering of augmented reality elements in the augmented reality display 1306 in response to the end user 23 scanning the physical environment 1302 in real-time. As shown in FIGS. 13, 14 and 16, the end user instance 218″ identified a first known user from the physical environment 1302. As shown in FIG. 17, as the end user 23 moves the field of the camera 220 to place a different human subject into the frame of the augmented reality display, the end user instance 218″ updates in real time to display the first augmented reality element 1306 comprising the graphical indication of a selection of a human subject's face from the physical environment 1302 and, optionally, the graphical indication that the end user instance 218″ of the augmented reality application is searching the human subject's face according to the facial image processing model.

Figure 18:
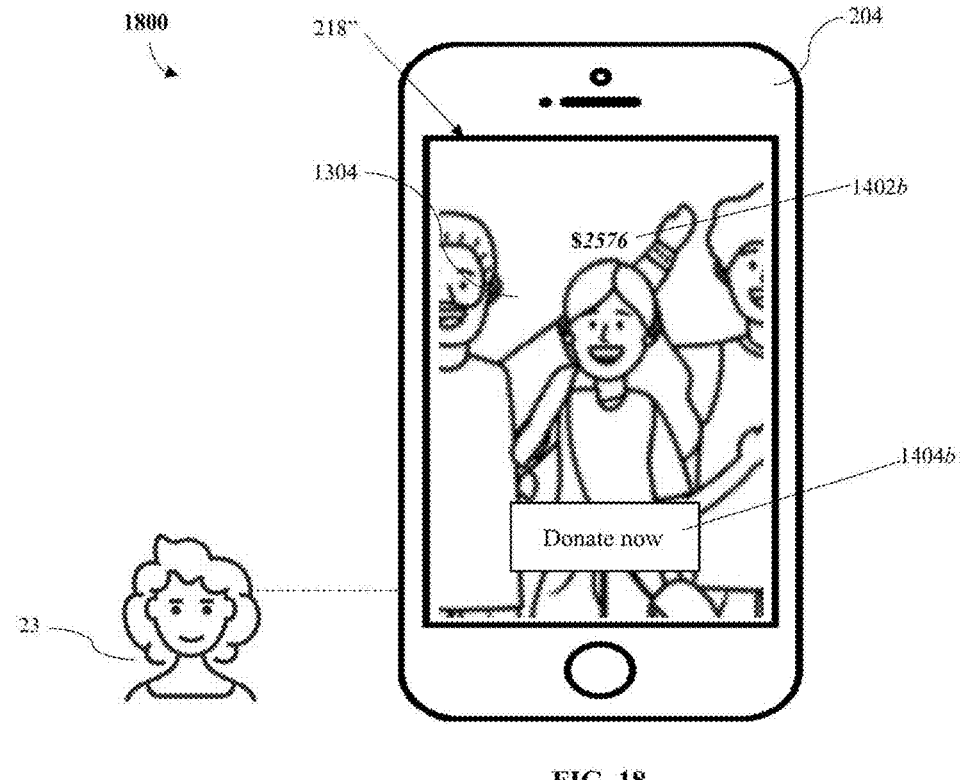
FIG. 18 is an illustration of a graphical user interface of an augmented reality system for facilitating online transactions, in accordance with certain aspects of the present disclosure.

Referring now to FIG. 18, an illustration 1800 of a graphical user interface of an augmented reality system for facilitating online transactions is shown. In accordance with certain aspects of the present disclosure, the augmented reality system may comprise system 200 as shown and described in FIG. 2. In accordance with certain aspects of the present disclosure, illustration 1800 depicts the dynamic modification (in real-time) of an updated instance of the second augmented reality element 1402*b* and an updated instance of the third augmented reality element 1404*b*. In accordance with certain aspects of the present disclosure, end user instance 218″ modifies the second augmented reality element 1402*b* to display a fundraising total for the new known user present in the view of the augmented reality display 1304. End user instance 218″ may also modify the hyperlink in the third augmented reality element 1404*b* such that if the end user 23 taps on the third augmented reality element 1404*b*, the end user is directed to a payment form configured for a charitable fundraising campaign that is unique to the new known user.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

Any publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random-access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general-purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be in performed in an order other than the order illustrated, may be combined or divided, or may be performed simultaneously. It will also be understood that the blocks of the block diagrams illustrate, in some embodiments, merely conceptual delineations between systems, and one or more of the systems illustrated by a block in the block diagrams may be combined or shared hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While certain exemplary embodiments have been described and shown in the accompanying drawings, it is to be understood that such embodiments are merely illustrative of, and not restrictive on, the broad invention, and that this invention is not limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A processor-implemented method comprising:

receiving, with at least one processor, a digital image of a face, wherein the face is associated with a first user;

processing, with the at least one processor, the digital image of the face of the first user to extract one or more features of the first user's face, wherein the one or more features are analyzed according to a facial recognition processing model;

associating, with the at least one processor, an output of the facial recognition processing model with a globally unique identifier in an application database, wherein the globally unique identifier is associated with a charitable fundraising campaign, wherein the charitable fundraising campaign is associated with the first user in the application database;

presenting, at a display of a smartphone comprising a camera, an instance of a mobile software application comprising a graphical user interface to a second user, wherein the display comprises a touch-screen interface;

scanning, with the camera of the smartphone, a live environment by the second user;

displaying, at the display of the smartphone, a real-time view of the live environment at the graphical user interface of the mobile software application;

processing, with the at least one processor in real-time, digital images received at the camera according to the facial recognition processing model, wherein the facial recognition processing model is configured to recognize at least one face from the live environment and determine whether the at least one face comprises the first user's face; and rendering, with the at least one processor via the instance of the mobile software application, a first graphical element in the real-time view of the live environment in response to determining the at least one face comprises the first user's face, wherein the first graphical element is rendered in proximity to the first user's face in the real-time view of the live environment, wherein the first graphical element is rendered at a position defined by a predetermined spatial offset relative to a facial bounding region of the first user's face in the real-time view of the live environment, wherein the facial bounding region is determined for each of the digital images received at the camera, and wherein the first graphical element is responsive to maintain the predetermined spatial offset relative to the facial bounding region as the first user moves in the real-time view of the live environment, wherein, when a second face is detected in the real-time view of the live environment, the first graphical element continues to be rendered according to the facial bounding region of the first user's face unless the second user provides an input selecting the second face, wherein the first graphical element comprises at least one embedded operation configured to command at least one function of the instance of the mobile software application in response to the second user tapping the first graphical element at the display of the smartphone, wherein the first graphical element is configured according to an output of the facial recognition processing model.

2. The processor-implemented method of claim 1 further comprising rendering a second graphical element in the real-time view of the live environment, wherein the second graphical element comprises a graphical display of a fundraising total for the charitable fundraising campaign, wherein the fundraising total is determined by querying a transaction database storing donation transaction data for the charitable fundraising campaign executed via a payment gateway.

3. The processor-implemented method of claim 2 further comprising updating the second graphical element in real-time to display a real-time fundraising total associated with the first user for the charitable fundraising campaign, wherein updating the second graphical element in real-time comprises updating the fundraising total in response to receiving transaction data from the payment gateway and storing the transaction data in the transaction database.

4. The processor-implemented method of claim 1 wherein, upon determining the at least one face comprises the first user's face, the first graphical element is configured to comprise a graphical display of a word or image personalized for the first user.

5. The processor-implemented method of claim 1 further comprising updating in real-time, with the at least one processor via the instance of the mobile software application, the first graphical element in response to recognizing a second or subsequent face from the digital images received at the camera.

6. The processor-implemented method of claim 5 wherein the second or subsequent face is different from the first user's face.

7. The processor-implemented method of claim 1 further comprising rendering a second graphical element in the real-time view of the live environment, wherein the second graphical element is rendered in proximity to a different face than the first user's face.

8. A processor-implemented system comprising:

a smartphone comprising a camera and a touch-screen display; and at least one server communicably engaged with the smartphone via a communications network, wherein the at least one server comprises at least one processor and a non-transitory computer readable storage medium having instructions stored thereon that, when executed by the at least one processor, cause the at least one processor to perform one or more operations, the one or more operations comprising:

processing one or more digital images of one or more faces according to a facial recognition processing model to identify a first face;

associating the first face in the one or more faces with a globally unique identifier in an application database, wherein the globally unique identifier is associated with a charitable fundraising campaign stored in the application database;

providing a mobile software application to the smartphone, wherein the mobile software application comprises a graphical user interface comprising a real-time viewer for the camera, wherein the graphical user interface is rendered at the touch-screen display of the smartphone;

scanning a live environment with the camera of the smartphone;

displaying a real-time view of the live environment at the graphical user interface;

processing digital images from the real-time view of the live environment according to the facial recognition processing model, wherein the facial recognition processing model is configured to identify the first face from one or more faces present in the real-time view of the live environment; and rendering a first graphical element in the real-time view of the live environment in response to identifying the first face from the digital images from the real-time view of the live environment, wherein the first graphical element is rendered in proximity to the first face in the real-time view of the live environment, wherein the first graphical element is rendered at a position defined by a predetermined spatial offset relative to a facial bounding region of the first face in the real-time view of the live environment, wherein the facial bounding region is determined for each of the digital images from the real-time view of the live environment, and wherein the first graphical element is responsive to maintain the predetermined spatial offset relative to the facial bounding region as the first face moves in the real-time view of the live environment, wherein, when a second face is detected among the one or more faces present in the real-time view of the live environment, the first graphical element continues to be rendered according to the facial bounding region of the first face unless a user provides an input selecting the second face, wherein the first graphical element comprises at least one embedded operation configured to command at least one function of the mobile software application in response to a user tapping the first graphical element at the touch-screen display of the smartphone, wherein the first graphical element is configured according to an output of the facial recognition processing model.

9. The processor-implemented system of claim 8 wherein the first graphical element comprises a graphical display of a fundraising total for the charitable fundraising campaign, wherein the fundraising total is stored in the application database, wherein the fundraising total is determined by querying a transaction database storing donation transaction data for the charitable fundraising campaign executed via a payment gateway.

10. The processor-implemented system of claim 9 wherein the one or more operations further comprise updating the first graphical element in real-time to display a real-time fundraising total for the charitable fundraising campaign in the real-time view of the live environment, wherein updating the first graphical element in real-time comprises updating the fundraising total in response to receiving transaction data from the payment gateway and storing the transaction data in the transaction database.

11. The processor-implemented system of claim 8 wherein the at least one function of the mobile software application comprises rendering a payment form for the charitable fundraising campaign at the graphical user interface in response to the user tapping the first graphical element, wherein rendering the payment form comprises rendering the payment form within the instance of the mobile software application at the touch-screen display; and wherein the payment form is pre-associated with the globally unique identifier for the charitable fundraising campaign.

12. The processor-implemented system of claim 8 wherein the one or more operations further comprise rendering a second graphical element in the real-time view of the live environment in response to the facial recognition processing model identifying a second or subsequent face in the real-time view of the live environment.

13. The processor-implemented system of claim 12 wherein the one or more operations further comprise determining whether the second or subsequent face is associated with a second or subsequent charitable fundraising campaign stored in the application database.

14. The processor-implemented system of claim 8 wherein the at least one embedded operation comprises a hyperlink configured to render a transaction form associated with the charitable fundraising campaign, wherein the hyperlink comprises the globally unique identifier.

15. A processor-implemented method comprising:

providing, with at least one processor, an end user application comprising an augmented reality interface to a smartphone comprising a camera and a touch-screen display, scanning a live environment with the camera of the smartphone;

displaying a real-time view of the live environment at the augmented reality interface;

processing, with the at least one processor, images received from the real-time view of the live environment according to a facial recognition processing model, wherein the facial recognition processing model is configured to identify a first face from one or more faces present in the real-time view of the live environment; and rendering a first graphical element in the real-time view of the live environment in response to identifying the first face from the real-time view of the live environment, wherein the first graphical element is rendered in proximity to the first face in the real-time view of the live environment, wherein the first graphical element is rendered at a position defined by a predetermined spatial offset relative to a facial bounding region of the first face in the real-time view of the live environment, wherein the facial bounding region is determined for each of the images received from the real-time view of the live environment, and wherein the first graphical element is responsive to maintain the predetermined spatial offset relative to the facial bounding region as the first face moves in the real-time view of the live environment, wherein, when a second face is detected among the one or more faces present in the real-time view of the live environment, the first graphical element continues to be rendered according to the facial bounding region of the first face unless a user provides an input selecting the second face, wherein the first graphical element comprises at least one embedded operation configured to command at least one function of the end user application in response to a user tapping the first graphical element at the touch-screen display of the smartphone, wherein the first graphical element is configured according to an output of the facial recognition processing model.

16. The processor-implemented method of claim 15 wherein the first graphical element comprises a graphical display of a fundraising total for a charitable fundraising campaign, wherein the fundraising total is determined by querying a transaction database storing donation transaction data for the charitable fundraising campaign executed via a payment gateway.

17. The processor-implemented method of claim 16 further comprising updating, with the at least one processor via the end user application, the first graphical element in real-time to display a real-time fundraising total for the charitable fundraising campaign in the real-time view of the live environment, wherein updating the first graphical element in real-time comprises updating the fundraising total in response to receiving transaction data from the payment gateway and storing the transaction data in the transaction database.

18. The processor-implemented method of claim 15 further comprising rendering in real-time, with the at least one processor via the end user application, a second graphical element in the real-time view of the live environment in response to identifying a second or subsequent face in the real-time view of the live environment.

19. The processor-implemented method of claim 18 further comprising determining, with the at least one processor, whether the second or subsequent face is associated with a second or subsequent charitable fundraising campaign stored in the application database.

20. The processor-implemented method of claim 15 wherein the at least one embedded operation comprises a hyperlink configured to render a transaction form associated with the charitable fundraising campaign at the touch-screen display of the smartphone.

* * * * *